US011526614B2

(12) United States Patent
Fang

(10) Patent No.: US 11,526,614 B2
(45) Date of Patent: Dec. 13, 2022

(54) CONTINUOUS VULNERABILITY MANAGEMENT SYSTEM FOR BLOCKCHAIN SMART CONTRACT BASED DIGITAL ASSET USING SANDBOX AND ARTIFICIAL INTELLIGENCE

(71) Applicant: Anchain.ai Inc., San Jose, CA (US)

(72) Inventor: Chunsheng Victor Fang, San Jose, CA (US)

(73) Assignee: ANCHAIN.AI INC., San Jose, CA (US)

( * ) Notice: Subject to any disclaimer, the term of this patent is extended or adjusted under 35 U.S.C. 154(b) by 514 days.

(21) Appl. No.: 16/653,599

(22) Filed: Oct. 15, 2019

(65) Prior Publication Data

US 2021/0110047 A1    Apr. 15, 2021

(51) Int. Cl.
| | |
|---|---|
| *G06F 21/57* | (2013.01) |
| *G06F 21/53* | (2013.01) |
| *G06F 21/55* | (2013.01) |
| *G06N 20/00* | (2019.01) |
| *G06F 16/27* | (2019.01) |
| *G06N 5/02* | (2006.01) |

(52) U.S. Cl.
CPC ............ *G06F 21/577* (2013.01); *G06F 16/27* (2019.01); *G06F 21/53* (2013.01); *G06F 21/554* (2013.01); *G06N 5/02* (2013.01); *G06N 20/00* (2019.01); *G06F 2221/033* (2013.01)

(58) Field of Classification Search
None
See application file for complete search history.

(56) References Cited

U.S. PATENT DOCUMENTS

| 11,257,073 B2* | 2/2022 | Padmanabhan ...... G06Q 20/383 |
| 2014/0218389 A1* | 8/2014 | Bennett ................. G06T 11/001 345/593 |
| 2014/0237545 A1 | 8/2014 | Mylavarapu et al. |

(Continued)

FOREIGN PATENT DOCUMENTS

JP    2019083013 A  *  5/2019  ............. G06Q 20/02

OTHER PUBLICATIONS

Machine Translation of JP2019083013 (Year: 2019).*

(Continued)

*Primary Examiner* — Luu T Pham
*Assistant Examiner* — James J Wilcox
(74) *Attorney, Agent, or Firm* — Rowan TELS LLC

(57) ABSTRACT

A continuous vulnerability management system for identifying, analyzing, protecting, and reporting on digital assets is disclosed. The continuous vulnerability management system comprises a sandbox engine configured to scan digital assets for vulnerabilities, including a static analysis unit for static code scanning, a dynamic analysis unit for analyzing compiled code, and a statistical analysis unit for processing a risk score and generating an audit report. A knowledge base is also disclosed, including a knowledge base engine configured to acquire information related to new vulnerabilities to digital assets. A risk scoring engine is configured to analyze sandbox engine outcomes and assign a risk score to each vulnerable asset. A security control system is configured to act on an identified vulnerable asset based on the risk score assigned to the identified vulnerable asset.

15 Claims, 17 Drawing Sheets

(56) References Cited

U.S. PATENT DOCUMENTS

| | | | |
|---|---|---|---|
| 2015/0237065 A1* | 8/2015 | Roytman | H04L 63/1433 726/25 |
| 2016/0065601 A1 | 3/2016 | Gong et al. | |
| 2017/0132619 A1 | 5/2017 | Miller et al. | |
| 2017/0344983 A1* | 11/2017 | Muftic | G06Q 20/065 |
| 2018/0025157 A1* | 1/2018 | Titonis | H04W 12/128 726/22 |
| 2018/0082235 A1* | 3/2018 | Larson | G06Q 10/06393 |
| 2018/0322292 A1* | 11/2018 | Tedeschi | H04L 63/1433 |
| 2019/0130114 A1 | 5/2019 | Smith et al. | |
| 2019/0156923 A1* | 5/2019 | Kain | G06F 16/958 |
| 2019/0229915 A1* | 7/2019 | Digiambattista | G06F 21/00 |
| 2019/0304578 A1* | 10/2019 | Kain | G06N 20/00 |
| 2019/0340266 A1* | 11/2019 | Vo | G06F 16/2365 |
| 2019/0340267 A1* | 11/2019 | Vo | G06F 16/2365 |
| 2020/0035341 A1* | 1/2020 | Kain | G16H 10/20 |
| 2020/0159888 A1* | 5/2020 | Ghose | G06F 9/3842 |
| 2022/0067752 A1* | 3/2022 | Fang | H04L 63/1425 |

OTHER PUBLICATIONS

Dasgupta "A Survey of Blockchain from Security Perspective," Journal of Banking and Financial Technology, pp. 1-18, Jan. 3, 2019 (Year: 2019).*

Wan et al "Practical and Effective Sandboxing for Linux Containers," Empirical Software Engineering, Springer, pp. 1-37, Jul. 4, 2019 (Year: 2019).*

Liao et al "SoliAudit: Smart Contract Vulnerability Assessment Based on Machine Learning and Fuzz Testing," 2019 Sixth International Conference on Internet of Things: Systems, Management and Security (IOTSMS), pp. 458-465. (Year: 2019).*

Yeboah-Ofori et al "Malware Attack Predictive Analysis in a Cyber Security Supply Chain Context Using Machine Learning," 2019 International Conference on Cyber Security and Internet of Things (ICSIoT), pp. 66-73 (Year: 2019).*

"Simple linear regression", Wikipedia, Mar. 24, 2020, https://en.wikipedia.org/wiki/Simple_linear_regression.

Advanced Malware Sandbox Market Analysis: "Must Have" Security Technology reaches Mass Adoption, Frost & Sullivan Market Engineering, K083-74, Sep. 2016.

anchain.ai, Introducing The World's First Smart Contract Auditing Sandbox—AnChain.AI Perspective on Code Security, Medium, Feb. 15, 2019.

Continuous Vulnerability Management, Center for Internet Security.

Dickson, Frank, Network Security Sandbox Market Analysis: APTs Create a "Must Have" Security Technology, Frost & Sullivan Market Engineering, NF0F-01, https://www.fireeye.com/content/dam/fireeye-www/current-threats/pdfs/pf/web/rpt-frost-sullivan-network-security-sand box-market-analysis.pdf.

Fuzzing, Owasp, https://www.owasp.org/index.php/Fuzzing.

Jiang, Bo, Liu, Ye, Chan, W.K., Contract Fuzzer: Fuzzing Smart Contracts for Vulnerability Detection, ASE '18, Sep. 3-7, 2018, Montpellier, France, pp. 1-11.

NPL_Sereum Protecting Existing Smart Contracts Against Re Entrancy Attacks_Rodler et al.

* cited by examiner

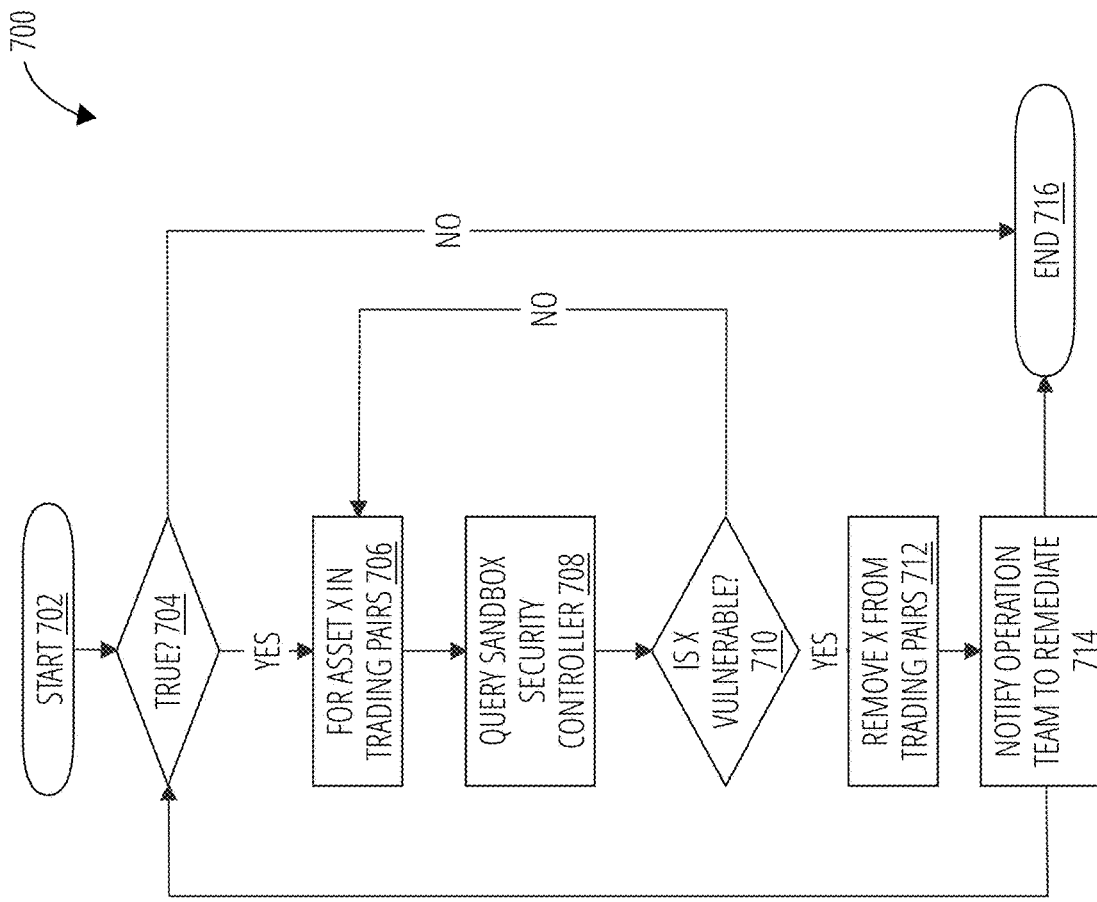
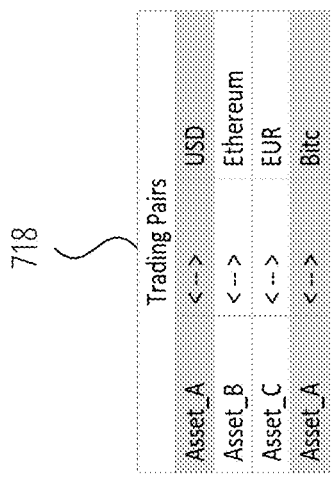
FIG. 7

```
pragma solidity ^0.4.24;
contract AnChainAiVulnerableCryptoAsset {
    mapping (address => uint) public balances;
    .....
    function withdraw() {
        if (!msg.sender.call.value(balances[msg.sender])()) {
            throw;
        }
        balances[msg.sender] = 0;
    } function() {
        throw;
    }
}
```

FIG. 8

CONTINUOUS VULNERABILITY MANAGEMENT SYSTEM FOR BLOCKCHAIN SMART CONTRACT BASED DIGITAL ASSET USING SANDBOX AND ARTIFICIAL INTELLIGENCE

BACKGROUND

The field of smart contract auditing, in its relatively brief history, already presents a number of challenges to ensure protection and/or rapid reaction to vulnerabilities. The motivation for such protection and reaction is manifest: smart contract vulnerabilities can cost financial institutions millions of dollars. Two cases in the last few years—the BeautyChain™ token (2018) containing an overflow bug leading to more than two billion USD of market value and a DAO hack (2016), due to reentrancy vulnerability, causing a multimillion-dollar loss—provide evidence of smart contract vulnerability challenges. A smart contract of the crypto asset has risk exposure to vulnerabilities, and therefore needs continuous protection.

Existing solutions to smart contract vulnerabilities have attempted to detect, isolate, control and report on vulnerabilities, but they generally suffer from the same defects allowing the vulnerabilities to be introduced in the first place. Auditing too often takes the form of manual expert auditing, e.g., ad hoc checks and "eyeballing." Formal verification processes, i.e., mathematically proving correct code, may be in place, but are highly prone to deterministic complexity, or an inability to check if varying inputs and initial conditions lead to differing results. Moreover, the algorithms often used for formal verifications require manual annotations in the code to guide the mathematical prover algorithm, thereby greatly increasing the likelihood of manual error(s). Some open source tools may be able to analyze code text but they lack systematic design and maintainability, and therefore don't meet an enterprise standard.

There is, therefore, a need for a smart contract monitoring solution that meets the exacting financial enterprise grade of a vulnerability management standard, including automation of monitoring and running algorithms, along with systematic design and maintainability.

BRIEF SUMMARY

A continuous vulnerability management system for blockchain smart contract based digital assets using a sandbox and artificial intelligence is disclosed. In one embodiment, a vulnerability management system for blockchain digital assets includes a sandbox engine configured to scan digital assets for vulnerabilities. The system also includes a knowledge base engine including artificial intelligence, where the knowledge base engine is configured to acquire information related to new vulnerabilities and threat intelligence. A risk scoring engine including machine learning is also part of the system, where the risk scoring engine is configured to analyze sandbox engine outcomes and assign a risk score to each vulnerable asset. A security control system is configured to take an action on an identified vulnerable asset based on the risk score assigned to the identified vulnerable asset.

In another embodiment, a method of protecting digital assets is disclosed, the method comprising scanning digital assets for vulnerabilities using a sandbox engine and acquiring information related to new vulnerabilities and threat intelligence using a knowledge base engine including artificial intelligence. The method includes analyzing sandbox engine outcomes and assigning a risk score to each vulnerable asset using a risk scoring engine including machine learning. Additionally, the method includes taking an action on an identified vulnerable asset based on the risk score assigned to the identified vulnerable asset using a security control system.

In still another embodiment, a non-transitory computer-readable storage medium is disclosed, the computer-readable storage medium including instructions that when executed by a computer, cause the computer to scan digital assets for vulnerabilities using a sandbox engine, and acquire information related to new vulnerabilities and threat intelligence using a knowledge base engine including artificial intelligence. The executed instructions also cause the computer to analyze sandbox engine outcomes and assign a risk score to each vulnerable asset using a risk scoring engine including machine learning. Additionally, the executed instructions cause the computer to take an action on an identified vulnerable asset based on the risk score assigned to the identified vulnerable asset using a security control system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a proactive scanning 700 in accordance with one embodiment.

FIG. 8 illustrates a smart contract 800 in accordance with one embodiment.

DETAILED DESCRIPTION

Figure 1:
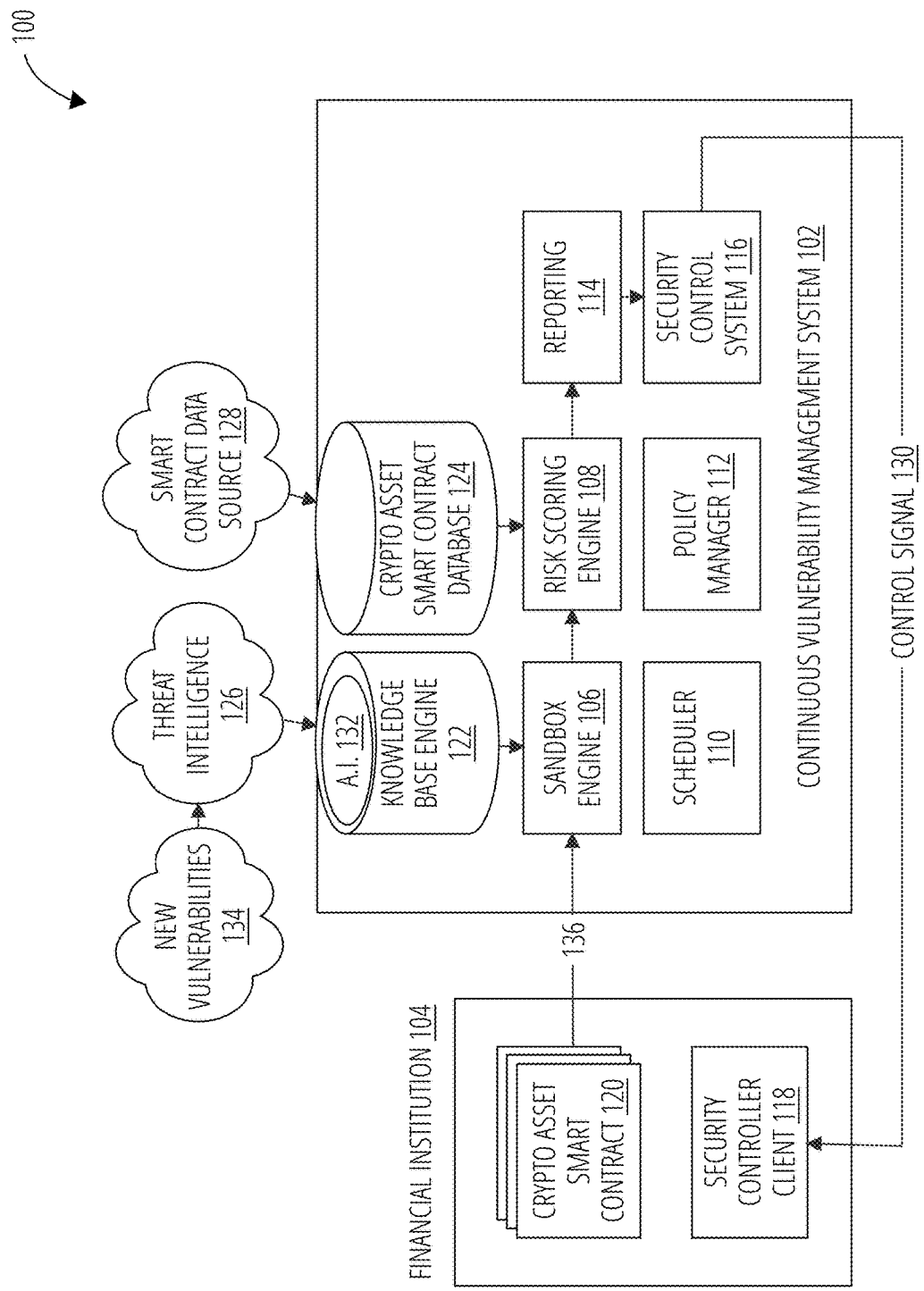
FIG. 1 illustrates a continuous vulnerability management system 100 in accordance with one embodiment.

"Accidental fork" refers to a branching in the chain that happens when two or more miners find a block at nearly the same time. The fork is resolved when subsequent block(s) are added and one of the chains becomes longer than the alternative(s). The network abandons the blocks that are not in the longest chain (they are called orphaned blocks).

"Action" refers to a control signal response to discovery of a vulnerable asset by the security control system, e.g., quarantining, adding to known vulnerable digital assets.

"Artificial intelligence" refers to the theory and development of computer systems able to perform tasks that normally require human intelligence, such as visual perception, speech recognition, decision-making, and translation between languages.

"Artificial Intelligence system" refers to a system including artificial intelligence methods and/or algorithms.

"At least one database of digital assets" refers to two or more of a collection of digital assets retained in a database, such as the database of global statistics.

"Audit report generation unit" refers to a means of creating an audit report. Embodiments of the audit report may include the location of vulnerabilities within a digital asset using a heatmap based on the statistical vulnerability data of the statistical analysis unit.

"Block time" refers to the average time it takes for the network to generate one extra block in the blockchain.

"Blockchain" refers to a distributed, decentralized, immutable database used to store encrypted data.

"Code" refers to a set of instructions forming a computer program which is executed by a computer. Code may take the form of source code, compiled code, machine code, etc.

"Compile" refers to a program or application that translates human-readable source code into computer-executable machine code.

"Compiled code" refers to computer-readable instructions translated from human-readable source code into computer-executable machine code.

"Crypto asset" refers to a digital asset designed to work as a medium of exchange that uses strong cryptography to secure financial transactions, control the creation of additional units, and verify the transfer of assets.

"Cryptocurrency" refers to a digital currency in which encryption techniques are used to regulate the generation of units of currency and verify the transfer of funds, operating independently of a central bank.

"Database of global statistics" refers to collection of statistical analysis on known digital assets and digital asset vulnerabilities.

"Digital asset" refers to any text or media that is formatted into a binary source and includes the right to use. An exemplary digital asset is a smart contract.

"Digital asset trading exchange" refers to a platform that allows customers to trade cryptocurrencies or digital currencies for other assets, such as conventional fiat money or other digital currencies.

"Dynamic analysis" refers to a testing procedure comprising part of the software debugging process and used to evaluate a program during real-time execution.

"Dynamic analysis capability" refers to the ability to perform dynamic analysis.

"Dynamic analysis unit" refers to the portion of the sandbox engine dedicated to dynamic analysis.

"Fork" refers to what happens when a blockchain diverges into two potential paths forward.

"Fuzzing" refers to an automated software testing technique that involves providing invalid, unexpected, or random data as inputs to a computer program. May also be referred to as fuzz testing.

"Hard fork" refers to a rule change such that the software validating blocks according to the old rules will detect the blocks produced according to the new rules as invalid.

"Heatmap" refers to a representation of data in the form of a map or diagram in which data values are represented as shades or colors.

"Heatmap data" refers to numeric or other data used to generate a heatmap.

"Identified vulnerable asset" refers to a digital asset found to include vulnerabilities and included in known vulnerable digital assets.

"Key-value pairs" refers to an abstract data type that includes a group of key identifiers and a set of associated values. Key-value pairs are frequently used in lookup tables, hash tables and configuration files.

"Knowledge base" refers to a technology used to store complex structured and unstructured information used by a computer system.

"Knowledge base engine" refers to a form of artificial intelligence (AI) that aims to capture the knowledge of human experts to support decision-making.

"Known legitimate digital assets" refers to a collection of digital assets, typically retained in a database, proven to be without vulnerabilities.

"Known vulnerable digital assets" refers to a collection of digital assets, typically retained in a database, proven to include vulnerabilities.

"Legitimate digital assets" refers to Digital assets proven to be without vulnerabilities.

"Machine learning" refers to an application of artificial intelligence (AI) that provides systems the ability to automatically learn and improve from experience without being explicitly programmed.

"New vulnerabilities" refers to Vulnerabilities previously undiscovered and not registered in a database of known vulnerable digital assets.

"Offline training engine" refers to a non-executable version of a software process in which a model, typically based on artificial intelligence, learns patterns or sequences based on specific inputs.

"Online prediction engine" refers to a dynamic version of a software process in which a model, typically based on artificial intelligence, makes predictions based on learning from at least an offline training engine.

"Orphaned blocks" refers to blocks in an abandoned fork.

"Private blockchain" refers to (i.e., permissioned blockchains) blockchains that use an access control layer to govern who has access to the network. In contrast to public blockchain networks, validators on private blockchain networks are vetted by the network owner. They do not rely on anonymous nodes to validate transactions nor do they benefit from the network effect. Private blockchains can also go by the name of 'consortium' or 'hybrid' blockchains.

"Provided training data" refers to inputs to an offline training engine, typically comprising feature vectors from units within the sandbox engine.

"Reentrancy vulnerability pattern" refers to a pattern in the software of digital assets in which vulnerability consists of multiple invocations being able to run concurrently.

"Regression model" refers to a statistical model used to investigate the relationship between two or more variables and estimate one variable based on the others.

"Risk score" refers to the numeric output of a risk scoring engine.

"Risk scoring engine" refers to a software application or process assigning a numeric score within a standardized scale that assesses the potential vulnerability of a digital asset or set of digital assets.

"Sandbox" refers to a testing environment that isolates untested code changes and experimentation from the production environment or repository.

"Sandbox engine" refers to a software application for executing a sandbox.

"Sandbox engine outcomes" refers to data, evaluations, and/or analyses as generated by a sandbox engine. Specifically, the results of the static analysis, dynamic analysis, and statistical analysis of the sandbox engine.

"Security control system" refers to an access control system able to characterize activity and incoming data to identify patterns and recognize certain conditions that increase the threat to an asset.

"Similar digital assets" refers to digital assets exhibiting similar qualities based on static analysis, dynamic analysis, and statistical analysis.

"Smart contract" refers to contracts that can be partially or fully executed or enforced without human interaction. One of the main objectives of a smart contract is automated escrow. The IMF believes smart contracts based on blockchain technology could reduce moral hazards and optimize the use of contracts in general. Due to the lack of widespread use their legal status is unclear. a blockchain implementation that enables the coding of contracts that execute when specified conditions are met. A blockchain smart contract is enabled by logic that defines and executes an agreement. For example, ethereum solidity is an open-source blockchain project that was built specifically to realize this possibility by implementing a Turing-complete programming language capability to implement smart contracts.

"Soft fork" refers to a change of rules that creates blocks recognized as valid by the old software, i.e. it is backwards-compatible.

"Static analysis" refers to a method of analyzing and evaluating search code without executing a program.

"Static analysis unit" refers to an area of the sandbox engine dedicated to static analysis.

"Static code scanning" refers to the act of searching static code for known or unknown vulnerabilities.

"Statistical analysis unit" refers to an area of the sandbox engine dedicated to analyzing risk scores against a database of global statistics.

"Statistical vulnerability data" refers to a collection of scored vulnerabilities for known vulnerable digital assets from the database of global statistics.

"Threat intelligence" refers to information an organization uses to understand the threats that have, will, or are currently targeting the organization. This information is used to prepare, prevent, and identify cyber threats looking to take advantage of valuable resources.

"Trade" refers to an exchange of digital assets, typically within an exchange.

"Trading" refers to the act of exchanging trades.

"Virtual machine" refers to a software program or operating system exhibiting the behavior of a separate computer, but capable of performing tasks such as running applications and programs like a separate computer.

"Vulnerabilities" refers to a cyber-security term that refers to flaws in a system that can leave it open to attack. A vulnerability may also refer to any type of weakness in a computer system itself, in a set of procedures, or in anything that leaves information security exposed to a threat.

"Vulnerable asset" refers to a digital asset found to include vulnerabilities.

Given the challenges described above, an innovative system design and method for continuous protection of smart contracts against known and detectable vulnerabilities comprises a wide-ranging set of characteristics. First, the design and method may include behavioral accuracy. Because smart contracts often perform automated functions (e.g., on a blockchain), how these contracts act may present at least the same threat of vulnerabilities as that of source code text. Additionally, analysis may require automation to reduce the likelihood of manual errors inherent in code review by human experts or adding auxiliary code comments to help analysis such as formal verification.

Next, since new vulnerabilities appear almost constantly, the design and method may require adaptability: a vulnerabilities knowledge base and a blockchain smart database may expand as new vulnerabilities are detected allowing customers to stay ahead of risk factors on their digital assets. Along with adaptability, the engines and analysis may also require learning, e.g., machine learning/artificial intelligence, through model training and similar methods to intelligently learn from an abundance of data. Finally, the design and method may require extensibility: the various engines and analysis processes deployed to detect digital asset vulnerabilities may be extended, replaced, upgraded or otherwise replaced as new threats arise or new vulnerability detection technologies become available.

Throughout this disclosure, specific examples using Solidity Smart Contract for Ethereum blockchain are used, but the disclosure is not limited thereto. The systems and methods in this disclosure may be applied to any compatible blockchains such as HYPERLEDGER (IBM), QUORUM (JP Morgan Chase), CORDA (R3 LLC), EOSIO (C++ and Web Assembly smart contract), TRON (Raybo Technology Co.), and emerging Ethereum smart contract languages such as Ethereum WebAssembly (eWASM).

Referring to FIG. 1, a continuous vulnerability management system 100 is shown according to an embodiment. The continuous vulnerability management system 102 comprises a number of components that pass a crypto asset smart contract 120 through various algorithms and processes to gauge the vulnerabilities of the crypto asset smart contract 120, assign a risk score, report on the score and potentially feed back a control signal 130 advising actions such as suspension (of the contract), quarantining/resuming, and so on.

The continuous vulnerability management system 102 first receives a crypto asset smart contract 120 from a financial institution 104 that has arranged for checking vulnerabilities of its smart contracts. Smart contracts, generally, are self-executing contracts, e.g., can be sent automatically without third party intervention, with the terms of the agreement between buyer and seller directly written into lines of code. A crypto asset is a digital asset 136 generally designed to work as a medium of exchange that uses strong cryptography to secure financial transactions, control the creation of additional units, and verify the transfer of assets. The code and the agreements contained herein exist across a distributed, decentralized blockchain network, the latter facilitating the self-executing nature of the smart contracts.

A sandbox engine 106, continually scans, e.g., without manual intervention, for vulnerabilities in digital assets such as the crypto asset smart contract 120 since a portfolio of active trades from a financial institution 104 may include between, for example, 50 and 100 digital assets. The sandbox engine 106 algorithms make minute comparisons of code—both static and compiled—between the received crypto asset smart contract 120 and similar digital assets in a knowledge base engine 122. The sandbox engine 106 performs static code scanning, e.g., scanning for anomalies and errors in static text code via searching and pattern matching techniques well known to those skilled in the art. The sandbox engine 106 may additionally perform a dynamic analysis on the results of compiling the smart contract source code into compiled code and executing the compiled code in a virtual machine environment, e.g., a software program or operating system capable of performing tasks such as running applications and programs like a separate computer. The knowledge base engine 122 may include outputs from threat intelligence 126, a continuously updated and published database of source and compiled code threats, including new vulnerabilities 134. The knowledge base engine 122 may receive such outputs from the threat intelligence 126 by way of a standard "heartbeat" program, i.e., a program configured to transfer file records from a remote database on a flexibly periodic basis. The threat intelligence 126 may be filtered or otherwise correlated by use of artificial intelligence 132. A discussion and illustration in FIG. 2 describe these various processes of the sandbox engine 106 in greater detail below.

Once the crypto asset smart contract 120 has been scanned using static analysis, dynamic analysis or both, results pass to a risk scoring engine 108 to assess the vulnerabilities of the digital asset. The risk scoring engine 108 determines a risk score for the asset at least partly based on comparisons to records in a crypto asset smart contract database 124, which comprises a database of global statistics received from a smart contract data source 128. By checking a crypto asset smart contract 120, i.e., digital asset, against a population of similar digital assets from the crypto asset smart contract database 124, the risk scoring engine 108 generates statistical vulnerability data compared to the digital asset's vulnerabilities. Beyond these comparisons, the risk scoring engine 108 generates a risk score for the digital asset by additionally making use of a regression model, an offline training engine, an online prediction engine as described below and illustrated in FIG. 2.

A scheduler 110 determines the periodicity of ingesting digital assets according to at least date and time. The time resolution (e.g., to the minute, second, and so on) and periodicity of the scanning schedule may be determined by the financial institution 104 or the continuous vulnerability management system 102 or the two in agreement. Additionally, a policy manager 112 specifies rules and standards determining the actions to be taken with vulnerabilities and directs such decisions to the security control system 116 to be passed as a control signal 130 back to the financial institution 104. Once vulnerabilities have been identified via the risk score, reporting 114 of the vulnerabilities passes to a security control system 116, which then alerts the security controller client 118 at the financial institution 104 as to whether the assessed digital asset or digital assets may be subject to suspension, quarantining/resuming, or other security measures.

Figure 2:
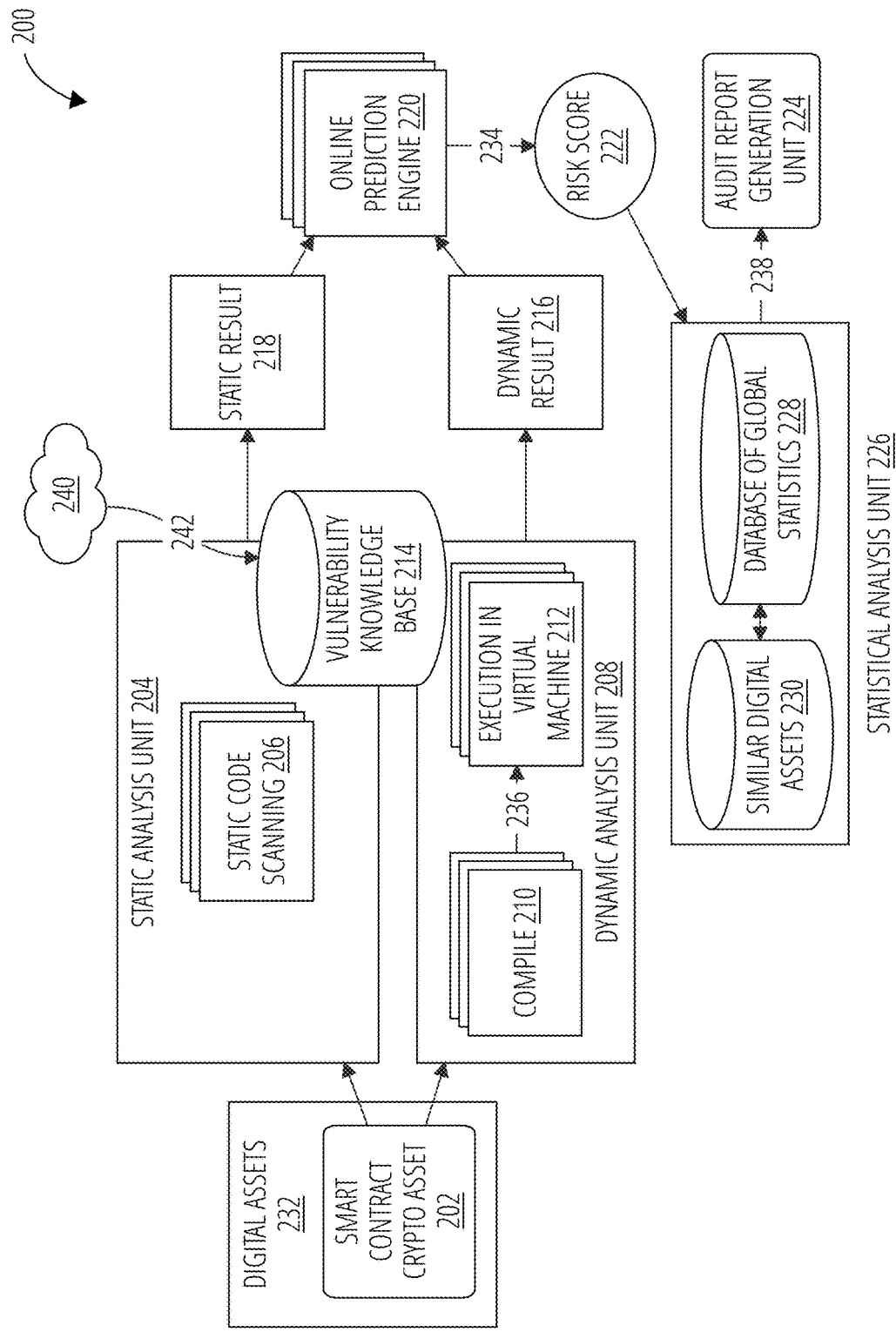
FIG. 2 illustrates sandbox engine units 200 in accordance with one embodiment.

Referring to FIG. 2, sandbox engine units 200 according to various embodiments are described and illustrated. As noted above, the sandbox engine continually scans for vulnerabilities in digital assets 232 such as in a smart contract crypto asset 202. As also noted, the sandbox engine may perform two types of scanning on differing stages of code: a static analysis as shown by the static analysis unit 204 path and a dynamic analysis as shown by the dynamic analysis unit 208 path. The digital asset source code may be transferred to the sandbox engine using a file transfer protocol (e.g., FTP or similar) or other electronic file copying means known to those skilled in the art for moving files or data between computer devices. Static code scanning 206 takes the digital assets and searches them for anomalies and errors, e.g., deprecated syntax that might cause vulnerability, in their static text code via searching and pattern matching techniques. The anomalies and errors may represent software routines intended to cause harm when the source code is compiled and executed. While they may be otherwise difficult to identify, particularly in source code form, a vulnerability knowledge base 214 containing known source code threats aids the static code scanning 206 of the static analysis unit 204 in making these comparisons. Differences and/or similarities from these comparisons comprise a static result 218.

In certain embodiments, a dynamic analysis unit 208 also processes the smart contract crypto asset 202, but in this instance compiles the source code from the smart contract crypto asset 202 and executes the compiled code 236 in a secure environment. As shown, the first step of dynamic analysis for a smart contract crypto asset 202 is to compile 210 its source code. Compiling source code may typically be performed by a special program (i.e., a "compiler") that turns statements written in a high-level programming language into machine language usable by a computer processor, a well-known process by those skilled in the art. Once compiled, the compiled code 236 undergoes execution in virtual machine 212. A virtual machine environment, or virtual environment, allows for dynamic execution of the compiled code 236 in a secure environment, e.g., without potentially infecting a wider computing environment if executing (e.g., running) the program creates malware, implants viruses and so on. Symbolic execution is also available within the virtual machine secure environment allowing searches for known dynamic patterns such as reentrancy and fuzz testing using malformed inputs. As noted above, the vulnerability knowledge base 214 comprises results (e.g., from the smart contract data source 128) against which the execution in virtual machine 212 may be checked. In one embodiment, the vulnerability knowledge base 214 comprises a reentrancy vulnerability pattern 240, which may be detected by the dynamic analysis unit of the sandbox engine. In another embodiment, the reentrancy vulnerability pattern 240 may be described as key-value pairs 242. Differences or similarities from this comparison comprise the dynamic result 216, i.e., the output of the dynamic analysis unit 208.

As shown, an online prediction engine 220 evaluates both the static result 218 and dynamic result 216 of the static analysis and dynamic analysis, respectively, of the digital assets to generate a risk score 222 for each vulnerable asset 234. Details of how the online prediction engine 220 determines this risk score 222, including use of a regression model and an online prediction engine, are described below and illustrated in FIG. 5.

Figure 10:
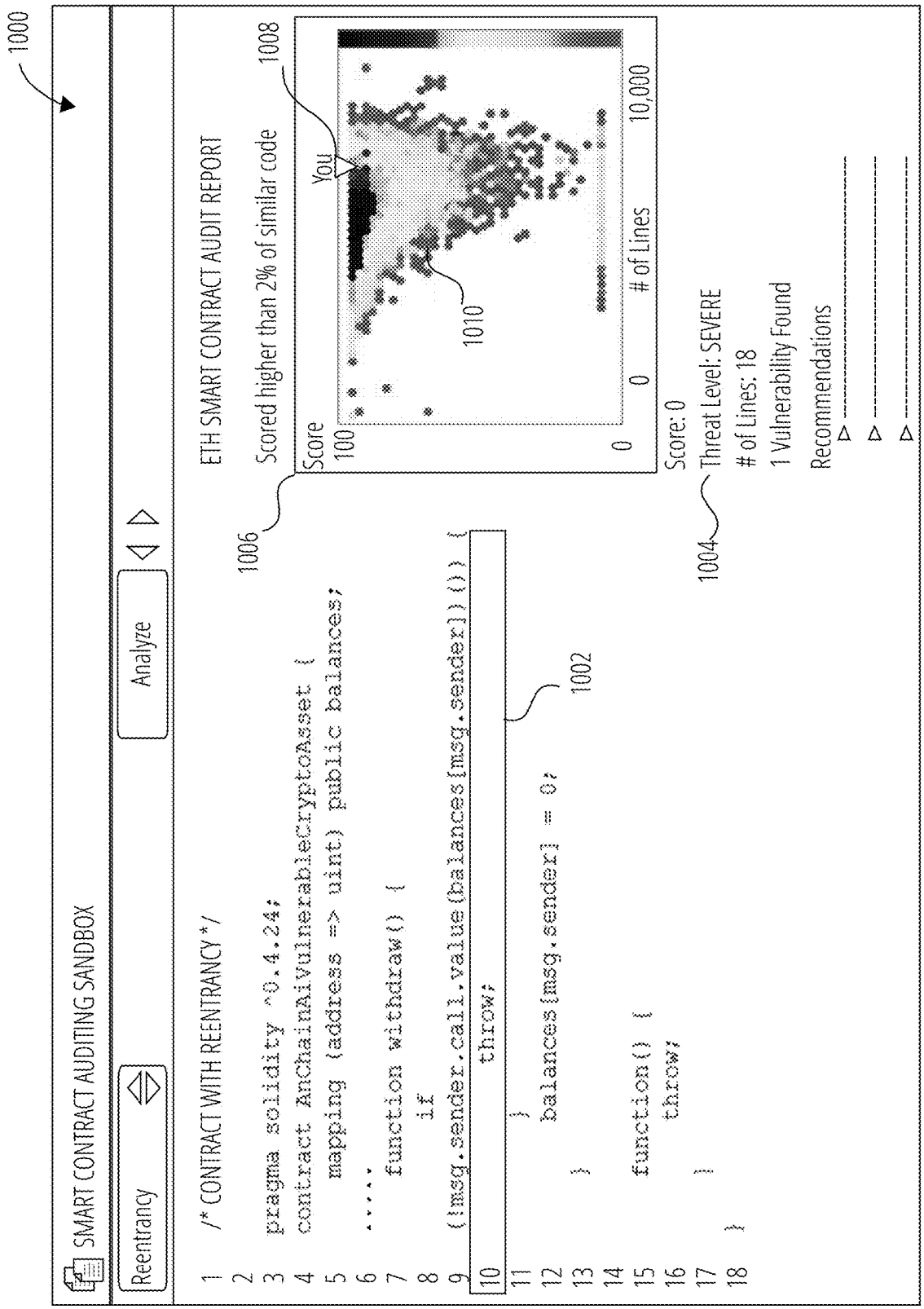
FIG. 10 illustrates an audit report 1000 in accordance with one embodiment.

For the purposes of this description, the online prediction engine 220 passes the risk score 222 to the statistical analysis unit 226 of the sandbox engine. The statistical analysis unit 226 comprises a database of global statistics 228 against which the risk score 222 from the online prediction engine 220 compares against similar digital assets 230. Once the standing of digital assets has been assessed with respect to each digital asset's vulnerabilities within the population of similar digital assets 230, the audit report generation unit 224 of the sandbox engine generates results based on the statistical vulnerability data 238 of the statistical analysis unit 226. FIG. 10 below describes further details and illustrations of the audit report generation unit.

Sandbox Engine

A sandbox engine may comprise development hardware, software, data, tools, interfaces, and policies necessary for starting an enterprise machine learning practice. A sandbox comprises an isolated testing environment enabling users to run programs or execute files without affecting the application, system or platform on which they run. Software developers use sandboxes to test new programming code. Cybersecurity professionals use sandboxes to test potentially malicious software. A sandbox may also be used to safely execute malicious code to avoid harming the device on which the code is running, the network or other connected devices. Using a sandbox to detect malware offers an additional layer of protection against security threats, such as stealthy attacks and exploits that use zero-day vulnerabilities. Exemplary sandbox applications include PDFs and other documents that include executable code, so an application like Adobe Reader runs PDF files in a sandbox, which stops them from escaping the PDF viewer and interfering with the rest of the computer. Microsoft Office also has a sandbox mode to stop unsafe macros from tampering with a system.

Smart Contract

A smart contract may comprise a computer protocol intended to digitally facilitate, verify, or enforce the negotiation or performance of a contract and allow for the performance of credible transactions without third parties. Smart contracts may be used to automate the uninterruptable transfer of crypto-tokens between users, according to agreed-upon conditions. A smart contract may be created in a computer text editor able to create source code and be written in any language consistent with blockchain technology, e.g., solidity, golang, java, javascript, C++, SQL.

Symbolic Execution

Symbolic execution may comprise a software testing technique useful to aid in the generation of test data and in proving program quality. A goal of symbolic execution in this context of software testing is to explore as many different program path conditions as possible in a given amount of time, and for each path to both generate a set of concrete input values exercising that path, and check for the presence of various kinds of errors including security vulnerabilities. One idea behind symbolic execution is using symbolic values, instead of concrete data values, as input and to represent the values of program variables as symbolic expressions over the symbolic input values. As a result, the output values computed by a program are expressed as a function of the symbolic input values. In software testing, symbolic execution is used to generate a test input for each execution path of a program. The ability to generate concrete test inputs is one of the major strengths of symbolic execution: from a test generation perspective, it may allow the creation of high-coverage test suites, while from a vulnerability perspective, it may provide developers with a concrete input that triggers the bug, which can be used to confirm and debug the error independently of the symbolic execution tool that generated it.

Reentrancy

Reentrancy describes a computer program or routine written so that the same copy in memory can be shared by multiple users. Reentrant code is commonly required in operating systems and applications intended to be shared in multi-use systems. Within a code structure, a reentrant function may be used by more than one task concurrently without fear of data corruption and, most importantly, may be interrupted at any time and resumed at a later time without loss of data. Reentrant functions either use local variables or protect their data when global variables are used.

Fuzz Testing

Fuzzing, fuzzing testing, or fuzz testing comprises an automated software testing technique that provides invalid, unexpected, or random data as inputs to a computer program. The program is then monitored for exceptions such as crashes, failing built-in code assertions, or potential memory leaks. Malformed inputs comprise a common input to fuzz testing.

Malformed Inputs

As noted above, malformed inputs may be deployed in fuzz testing to provide known dynamic patterns. If the failure-inducing input is large and mostly malformed, a developer may have difficulty understanding the cause of testing failure. Given the failure-inducing input, an automated minimization tool may be deployed to remove as many input bytes as possible while still reproducing the original error.

Key-Value Pairs

Key-value pairs indicate a set of two linked data items: a key, which is a unique identifier for some item of data, and the value, which is either the data that is identified or a pointer to the location of that data. Key-value pairs are frequently used in lookup tables, hash tables and configuration files.

Figure 3:
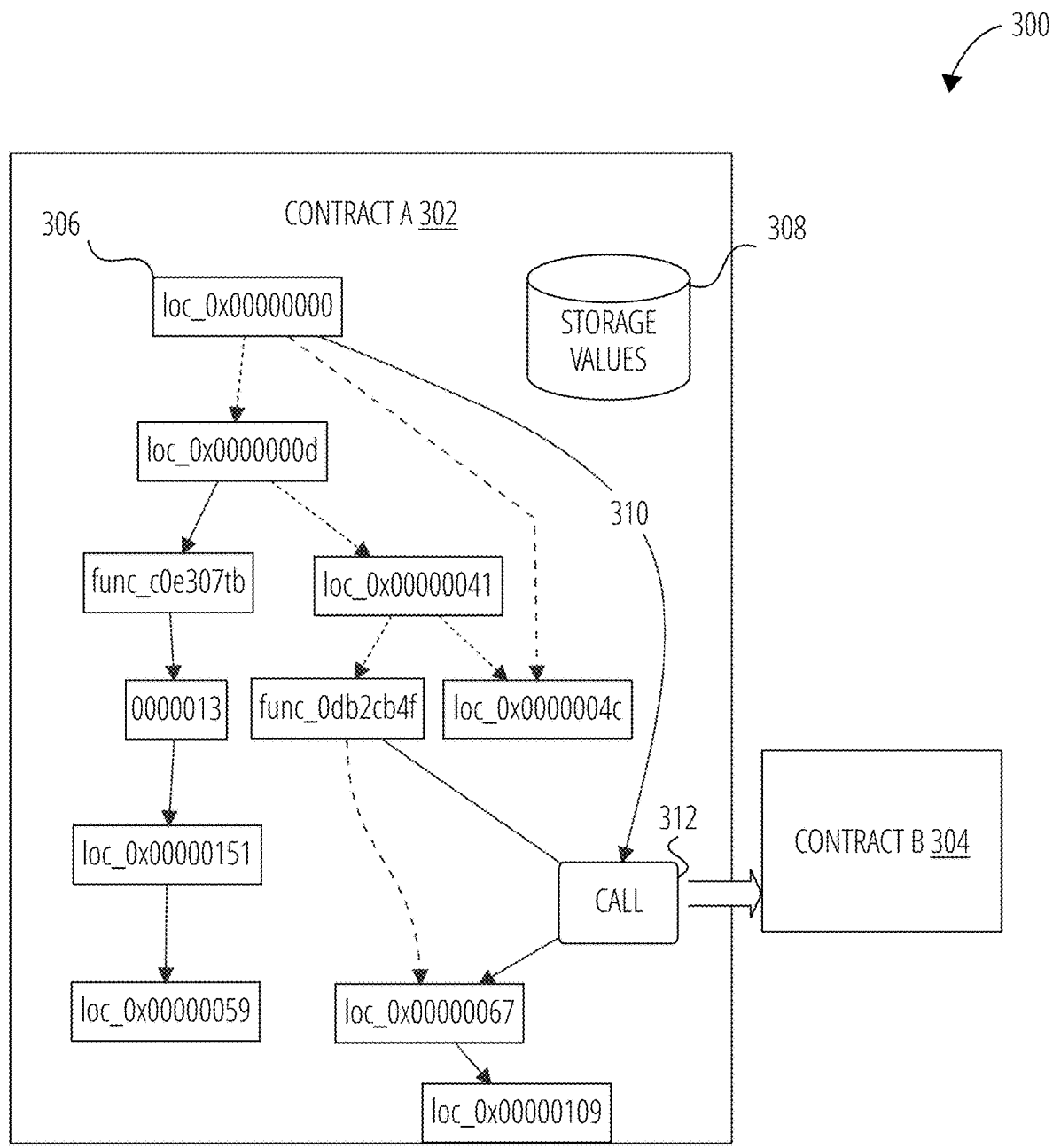
FIG. 3 illustrates a dynamic execution in virtual machine 300 in accordance with one embodiment.

Referring to FIG. 3, a dynamic execution in virtual machine 300 according to an embodiment is illustrated. As noted above, dynamic execution takes place within the dynamic analysis unit of sandbox engine, i.e., receiving digital asset source code, compiling the source code into compiled code (a.k.a., bytecode 306), and executing the compiled code within a virtual machine secure environment. Execution comprises dynamically executing the bytecode control flow graph based on the vulnerability knowledge base. When executed in the virtual machine, compiled smart contract bytecode 306 instructions, with the code, storage, balance, and so on, are recorded in the blockchain.

Detection of smart contract vulnerabilities in the dynamic analysis unit of the sandbox engine comprises detecting patterns in a dynamic control flow graph, as shown in FIG. 3, and recorded in the knowledge base engine 122. The flow represents dynamic execution of the smart contract compiled bytecode 306 in the virtual machine and monitoring by the dynamic analysis unit of the sandbox engine for the storage, memory and function call checking against the knowledge base engine 122 for known vulnerability patterns. An exemplary set of bytecode 306 instructions (e.g., locations and functions with corresponding memory locations) comprise contract A 302 with corresponding calls into contract B 304. As each call 312 (e.g., for storage, memory, or other computing function) is encountered, a path condition 310 for the execution is obtained before the call 312 executes. The path condition 310 is then checked with updated storage values 308 to determine if the path condition 310 remains valid, i.e., if the call 312 may be executed again with the updated storage values 308. If true, a vulnerability is flagged, as the call 312 receiver may re-execute the call 312 before finishing it.

Path Condition

A path condition comprises a sequence of bytecode 306 commands interpreted by a computer in an environment for executing compiled code. In the context of dynamic execution, e.g., monitoring for each call 312 in a smart contract, encountering a call 312 triggers the retrieval of the executable path condition 310 before the call 312 itself executes, to check if the same path condition with updated storage values 308 still holds (i.e., if the call can be executed again).

Figure 4:
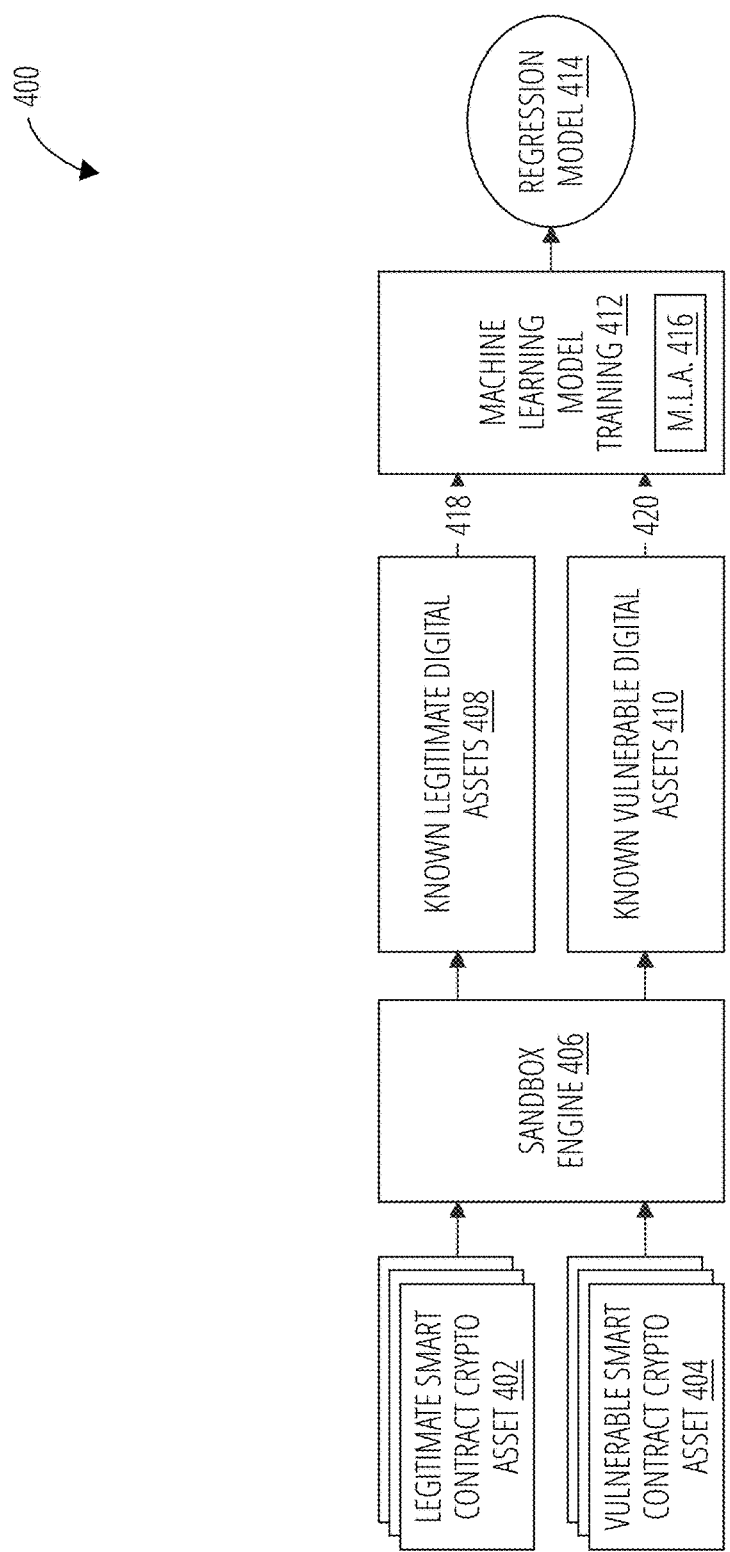
FIG. 4 illustrates a machine learning 400 in accordance with one embodiment.

Referring to FIG. 4, machine learning 400 according to an embodiment is illustrated. As previously described, a sandbox engine 406 accepts crypto asset smart contracts in the form of digital assets, e.g., from a financial institution. As shown, the smart contract crypto assets may be either legitimate digital assets or vulnerable digital assets by definition—that is, they are necessarily one or the other. Each digital asset type therefore describes a sandbox engine 406 input: either a legitimate smart contract crypto asset 402 or a vulnerable smart contract crypto asset 404. By verifying the legitimate smart contract crypto asset 402 against a known crypto assets database and the vulnerable smart contract crypto asset 404 against the knowledge base engine 122, both data sets constantly learn about new vulnerability behavior patterns and threat intelligence, the sandbox engine 406 verifies and outputs both known legitimate digital assets 408 and known vulnerable digital assets 410.

In one embodiment feature vectors may be formulated as inputs to machine learning model training 412 for both known legitimate digital assets 408 and known vulnerable digital assets 410. The feature vectors may comprise any aspect of the smart contract containing multiple numerical elements, e.g., frequency of occurrence of textual terms such as functions and variables, and taken collectively serve as provided training data for the machine learning model training 412.

Figure 15:
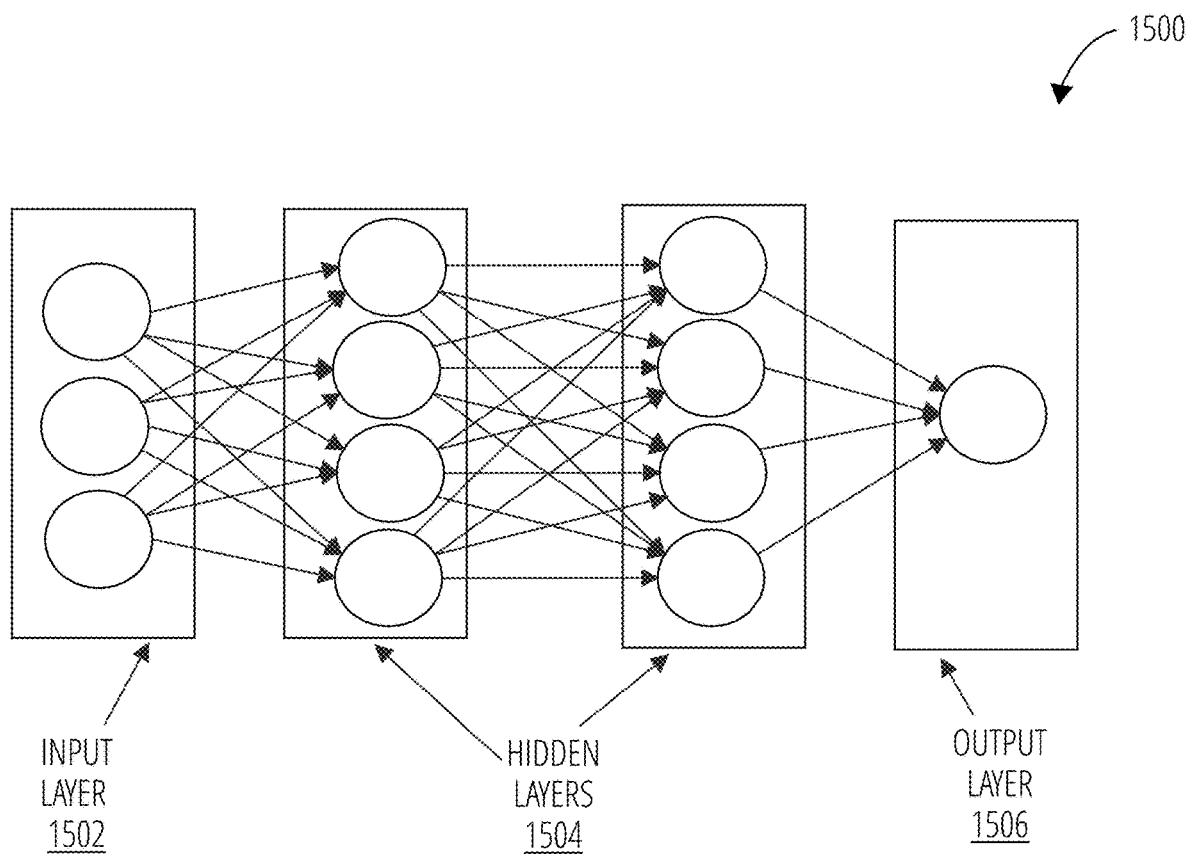
FIG. 15 illustrates a basic deep neural network 1500 in accordance with one embodiment.

Machine learning model training 412 comprises collecting provided training data, or the aforementioned feature vectors from the known legitimate digital assets 408 and known vulnerable digital assets 410 and using a neural network as discussed below and illustrated in FIG. 15 to train an offline training engine to estimate inputs of a machine learning algorithm.

Machine Learning Algorithm

A machine learning algorithm 416, in the context of evaluating smart contracts as digital assets, may be an off-line training engine, i.e., with the ability to estimate all parameters of a regression model with the ability to ingest feature vectors as model inputs and apply a regression model 414 to improve its results over time. Inputs comprising a set of numeric features may be conveniently described by a feature vector. In this context, both the known legitimate digital assets 408 and known vulnerable digital assets 410 may be described by a feature vector, an n-dimensional vector of numerical features that represent each set of assets. Many algorithms in machine learning require a numerical representation of objects, since such representations facilitate processing and statistical analysis. An example of reaching a two-way classification from a feature vector includes calculating the scalar product between the feature vector and a vector of weights, comparing the result with a threshold, and deciding the class based on the comparison. Algorithms for classification from a feature vector include nearest neighbor classification, neural networks, and statistical techniques such as Bayesian approaches. As described below and illustrated in FIG. 15, a neural network is utilized for the machine learning algorithm 416 for classification from the named feature vectors.

Regression Model

A regression model 414 comprises algorithms and analysis. Regression analysis is a set of statistical processes for estimating the relationships among variables. It includes many techniques for modeling and analyzing several variables, when the focus is on the relationship between a dependent variable and one or more independent variables. More specifically, regression analysis helps one understand how the typical value of the dependent variable changes when any one of the independent variables is varied, while the other independent variables are held fixed. Regression analysis additionally estimates the conditional expectation of a dependent variable given the independent variables—that is, the average value of the dependent variable when the independent variables are fixed.

Regression algorithms are named for their continuous outputs, meaning they may have any value within a range, in this case from the machine learning algorithm within the machine learning model training 412. In this case, the regression model take the form of a function, i.e., f(X), where f( ) is the regression model and X is input feature vectors from either the known legitimate digital assets 408 or known vulnerable digital assets 410, which serve as provided training data 418 and provided training data 420, respectively. The regression model may be linear or non-linear.

Figure 5:
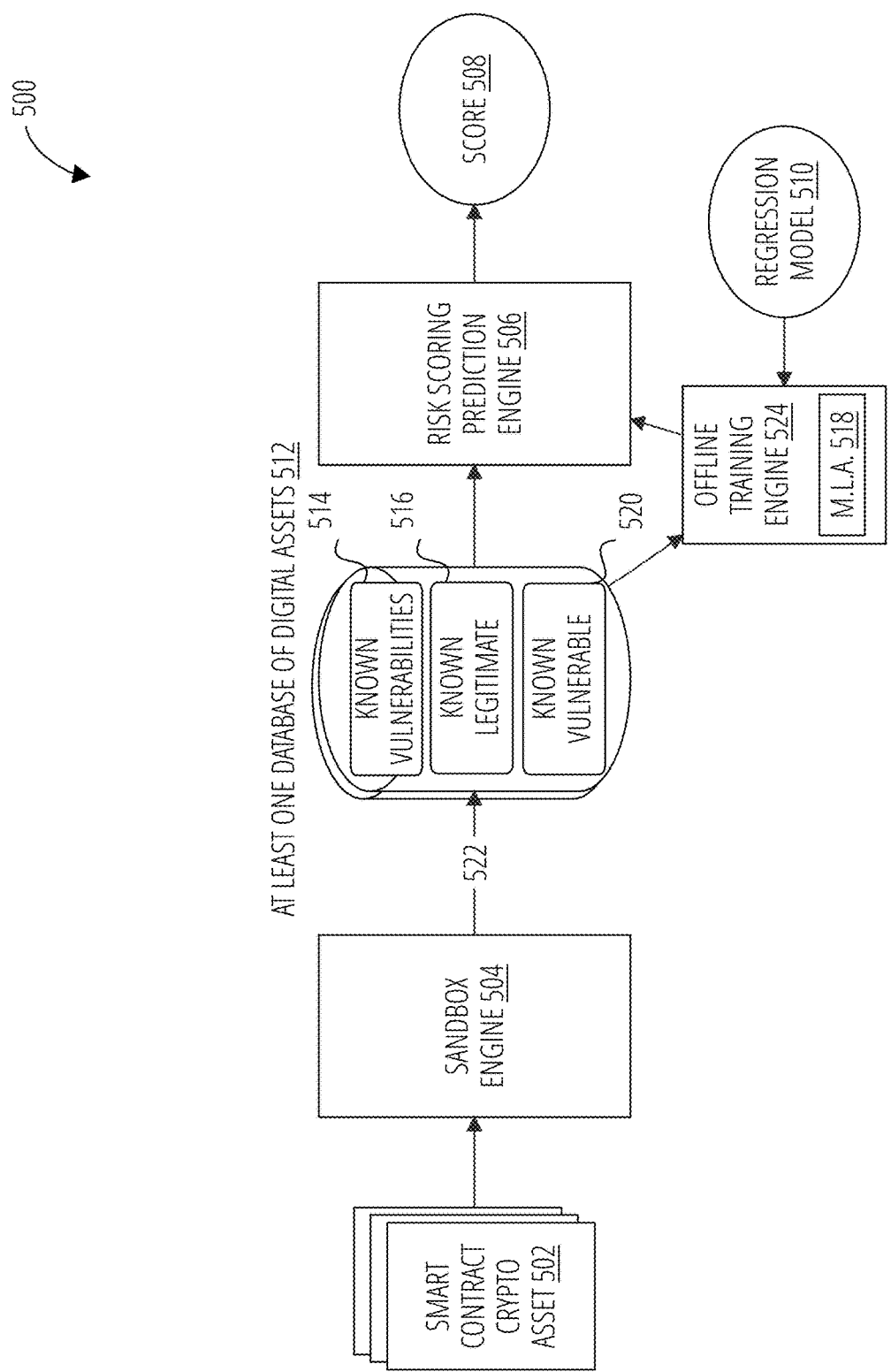
FIG. 5 illustrates a risk scoring engine 500 in accordance with one embodiment.

Referring to FIG. 5, a risk scoring engine 500 according to an embodiment is illustrated. As previously described, a sandbox engine 504 accepts a smart contract crypto asset 502 in the form of digital assets, e.g., from a financial institution. As shown, the smart contract crypto asset 502 may be either a legitimate digital asset or a vulnerable digital asset. Either of these digital asset types therefore displays as a sandbox engine 504 input. By verifying the legitimate digital asset against a known crypto assets database and the vulnerable digital asset against the knowledge base engine 122, both data sets constantly learning about new vulnerability behavior patterns and threat intelligence, the sandbox engine 504 uploads its sandbox engine outcomes 522 to at least one database of digital assets 512 one or more of known vulnerabilities 514, known legitimate digital assets 516, and/or known vulnerable digital assets 520. As noted above, the offline training engine 524, using the feature vectors from both the known legitimate digital assets 516 and known vulnerable digital assets 520, estimates parameters of the machine learning algorithm 518 using the regression model 510 as described.

The risk scoring engine 506 comprises the online training, using the regression model 510 trained in the offline process, to predict the score 508 for a specific smart contract. The risk scoring engine 506 thereby includes the regression model 510, the offline training engine 524, and access to at least one database of digital assets 512 comprised of known vulnerabilities 514, known legitimate digital assets 516, and known vulnerable digital assets 520.

To create a score 508 from the risk scoring engine 506, a quality scale (0-100) may be defined with 100 as the highest quality smart contract and 0 (zero) is the most vulnerable. With at least one database of digital assets 512 comprising known legitimate digital assets 516 (score of 100) and known vulnerable digital assets 520 (score of 0), the regression model 510 may be trained by interpolating the score from 0 to 100. The mathematics of the linear regression model 510 may also apply to a non-linear regression model. The function $Y_i = a + b_1 * Xs_i + b_2 * Xd_i$ is used to compute $Y_i$, the output quality score, where Xs represents the output of the static analysis, (e.g. deprecated syntax findings), Xd represents the output of the dynamic analysis, (e.g. Reentrancy vulnerability identification), and a, $b_1$, and $b_2$ are model parameters in the regression model learned from the dataset. The counter "i" for Y, Xs, and Xd, indicates the "i-th" data point in the training dataset, where i ranges from 1 to n. The parameters a, $b_1$, and $b_2$ may be computed using the following linear minimization algorithm:

$$\text{Find } \min_{\alpha,\beta} Q(\alpha, \beta), \text{ for } Q(\alpha, \beta) = \sum_{i=1}^{n} \hat{\varepsilon}_i^2 = \sum_{i=1}^{n} (y_i - \alpha - \beta x_i)^2. \quad \text{Equation 1}$$

Figure 6:
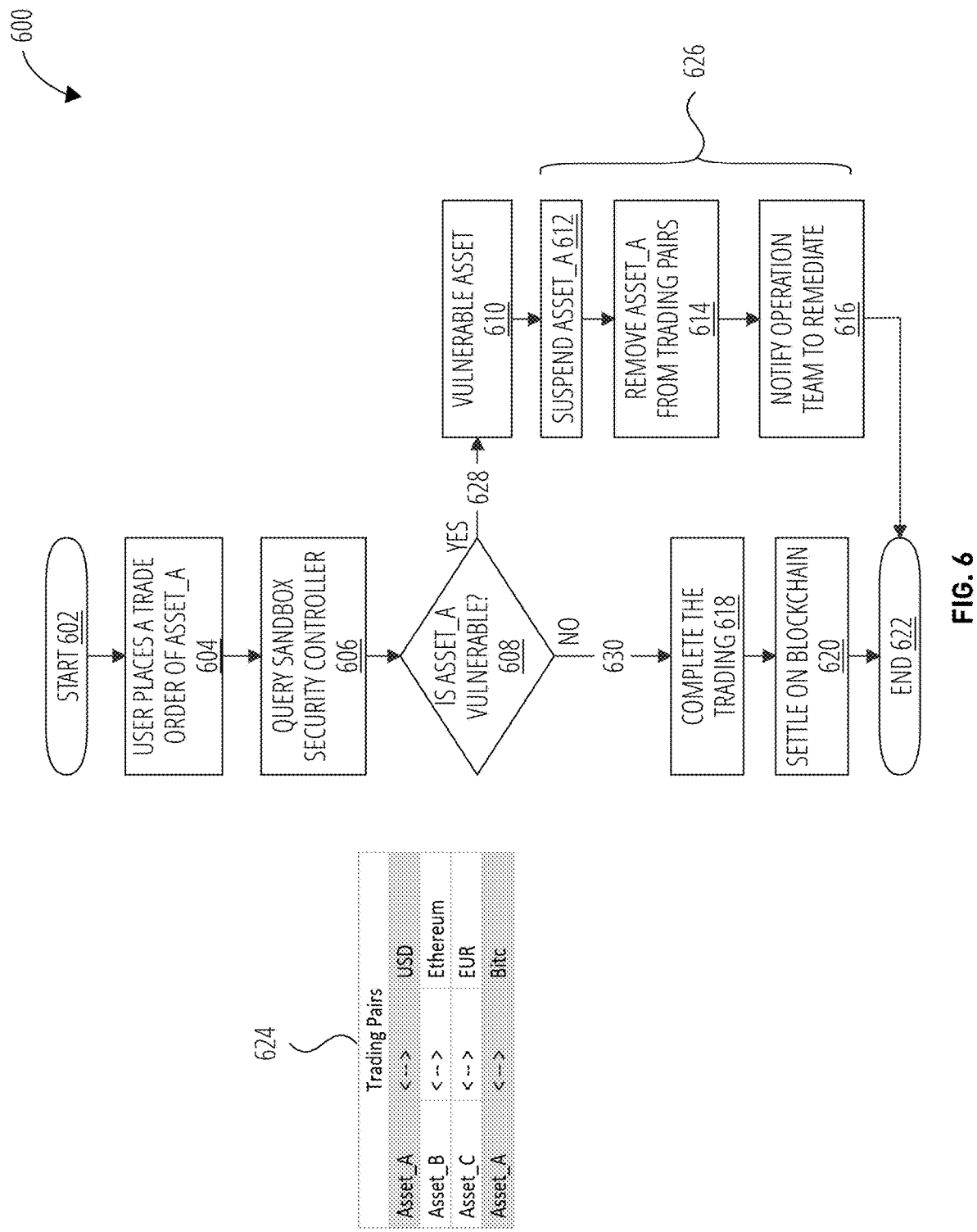
FIG. 6 illustrates a digital asset trading exchange 600 in accordance with one embodiment.

Referring to FIG. 6, a digital asset trading exchange 600 is illustrated. A security control system exists to at least in part, identify, protect, detect, respond to, and recover crypto assets in financial institutions. Exemplary institutions may be Crypto Exchange, Crypto Hedge Fund, Crypto Custody, and so forth. The security control system may automatically suspend trading for a vulnerable crypto asset, triggered by a user's placed trade order, in a crypto asset trading exchange. If a digital asset is determined to be vulnerable by the sandbox, only that digital asset is suspended from trading, e.g., other legitimate digital assets continue to function.

Embodiments of the security control system include logic, as described below, to identify digital assets, scan digital assets for vulnerabilities and identify those digital assets as vulnerable digital assets. The logic may further protect digital assets including the ability to suspend trading of vulnerable digital assets, and respond to a trade on the digital asset trading exchange 600. The trade may include vulnerable digital assets and legitimate digital assets, where the vulnerable digital assets are suspended and the legitimate digital assets are allowed to proceed.

In an embodiment, the logic begins at block start 602. At block 604, a user places a trade order of asset_A at a digital asset trading exchange. At block 606, logic queries a sandbox security controller to analyze the order at decision block 608 and determine whether asset_A is vulnerable. If asset_A is found to be vulnerable, it joins a set of vulnerable digital assets 628 and an action 626 is taken. Asset_A is now an identified vulnerable asset 610 and at block 612, asset_A is suspended from trading. At block 614 asset_A is removed from trading pairs 624 (e.g., for asset_A, USD/Bitcoin). At block 616, an operation team is notified to remediate, and the logic ends at done block 622.

Returning to decision block 608, if asset_A is determined not to be not vulnerable (e.g., it is legitimate and part of the set of legitimate digital assets 630), at block 618 trading completes, and asset_A is settled on the blockchain at block 620 before completing at done block 622.

Referring to FIG. 7, a proactive scanning 700 process is described. In a similar manner to the logic in the digital asset trading exchange 600 description above in FIG. 6, proactive scanning 700 represents another mode of a security control system. In this embodiment, the security control system continuously scans all digital assets in the trading pairs 718 for vulnerabilities. Once found, the digital asset is removed from the trading pairs 718 while others continue to function normally.

The logic to proactively scan digital assets begins at start 702. At decision block 704, if the scanning process is true (e.g., active), for an asset X in trading pairs 718 at block 706, the sandbox security control system is queried at block 708. If asset X is determined not to be vulnerable at decision block 710, the logic returns to check the next trading pair. If asset X is vulnerable at decision block 710, it is proactively removed from trading pairs 718 at block 712, and an operation team is notified to remediate the asset at block 714. At this point the logic is complete at done block 716.

Referring to FIG. 8, an exemplary smart contract 800 is illustrated. In this example, the syntax of the smart contract program language 802 is identified as solidity in the first line of code. Other notable features of this smart contract include the smart contract name 804 ("AnChainAiVulnerableCryptoAsset") and the body of smart contract code 806.

Figure 9:
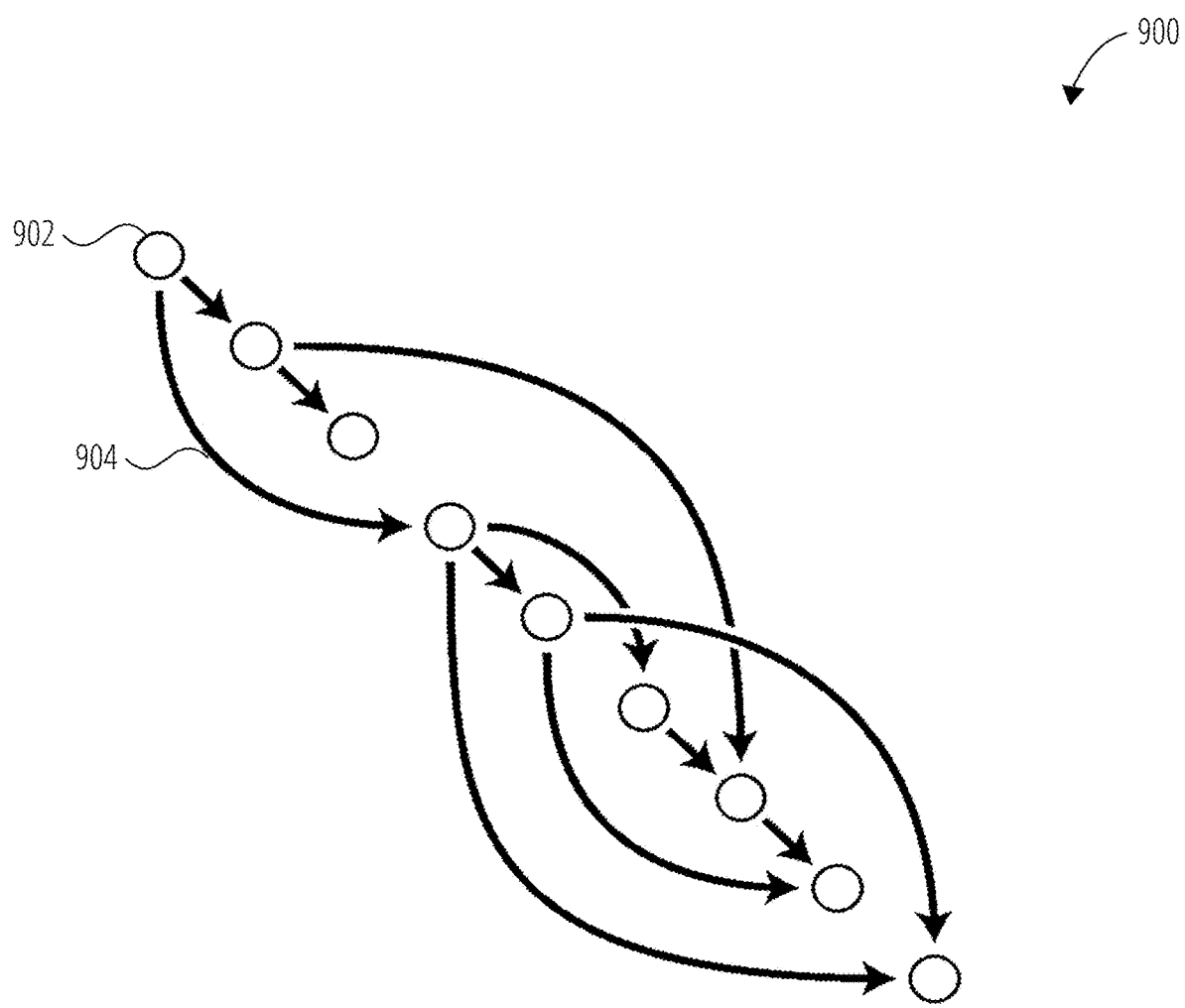
FIG. 9 illustrates a directed acyclic graph 900 in accordance with one embodiment.

Referring to FIG. 9, a directed acyclic graph 900 is shown that may use the protective features described above. A directed acyclic directed acyclic graph 900 (DAG) is a finite directed graph with no directed cycles, i.e., consisting of finitely many nodes 902 and edges 904 with each edge directed from one node to another, such that there is no way to start at any node and follow a consistently-directed sequence of edges that eventually loops back to the initial node again. Equivalently, a directed acyclic graph 900 is a directed graph that has a topological ordering, a sequence of the nodes such that every edge is directed from earlier to later in the sequence.

A topological ordering of a directed acyclic graph: every edge goes from earlier in the ordering (upper left) to later in the ordering (lower right). A directed graph is defined as acyclic if and only if it has a topological ordering.

Referring to FIG. 10, an exemplary audit report 1000 is illustrated. As described above and illustrated in FIG. 2, the risk score serves as an input to the statistical analysis unit of the sandbox engine. With the sandbox engine fully automated, the quality scores of all smart contracts may be computed at scale, while the vulnerability of an individual asset may also be isolated. A visualization, such as a heatmap 1006 drawn from heatmap data 1010 aids understanding of a crypto asset's standing in the entire digital asset population. In one embodiment, the heatmap 1006 illustrates a statistical ranking of Lines of Code vs. Risk score, with each cell indicating a cluster of similar smart contracts. The standing 1008 indicates the current smart contract crypto asset in scope and the code line 1002 indicates the vulnerability location. By using a standard clustering algorithm on sandbox behaviors, the most similar smart contracts may be identified.

The vulnerability auditing report, as shown, may be generated automatically, and the Risk/Compliance/Operation team in this case may be notified immediately, e.g., in the audit report 1000, the crypto asset indicated has a score of 0 (out of 100), indicating a severe level 1004 of vulnerability. This statistical standing among all 50,000 smart contracts visualized in the heatmap 1006, indicates it as among the worst smart contracts.

Figure 11:
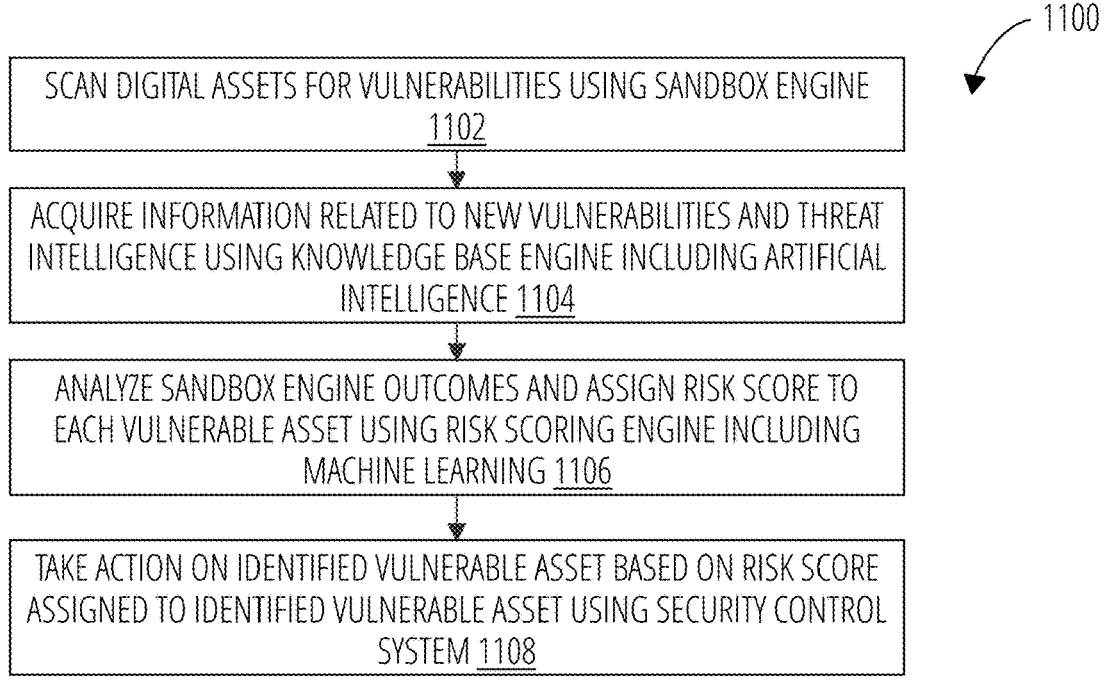
FIG. 11 illustrates a method 1100 of protecting digital assets in accordance with one embodiment.

Referring to FIG. 11, in block 1102 a method 1100 of protecting digital assets scans digital assets for vulnerabilities using a sandbox engine. In block 1104, the method 1100 acquires information related to new vulnerabilities and threat intelligence using a knowledge base engine including artificial intelligence. In block 1106, the method 1100 analyzes sandbox engine outcomes and assigns a risk score to each vulnerable asset using a risk scoring engine including machine learning. In block 1108, the method 1100 takes an action on an identified vulnerable asset based on the risk score assigned to the identified vulnerable asset using a security control system.

Figure 12:
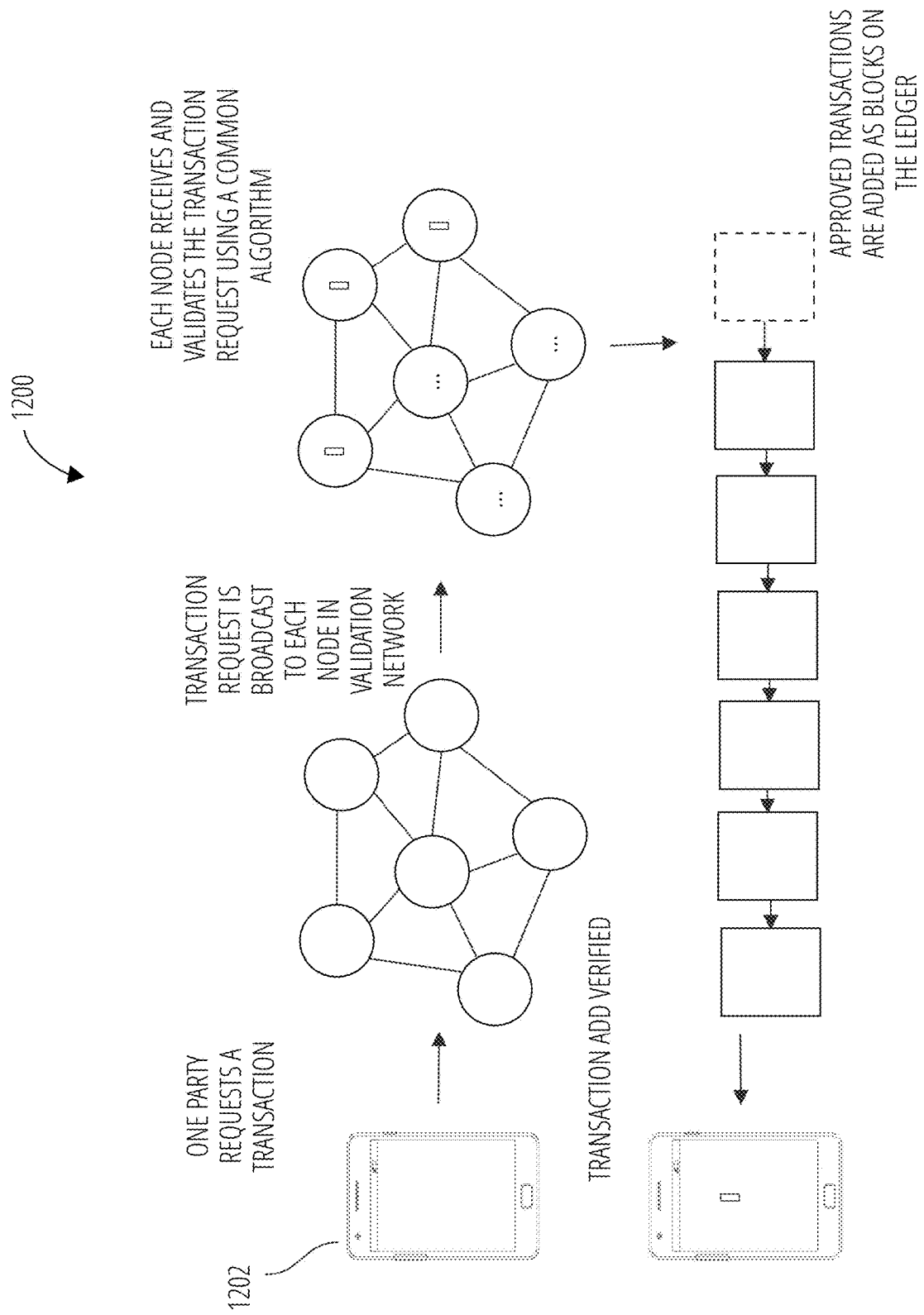
FIG. 12 illustrates a blockchain transaction process 1200 in accordance with one embodiment.

Referring to FIG. 12, a blockchain transaction process 1200 is an ever-growing set of data blocks. Each block records a collection of transactions. Blockchains distribute these transactions across a group of computers. Each computer maintains its own copy of the blockchain transactions.

A blockchain is a continuously growing list of records, called blocks, which are linked and secured using cryptography. Each block typically comprises a cryptographic hash of the previous block, a timestamp, and transaction data. By design, a blockchain is resistant to modification of the data.

Blockchains may implement an open, distributed ledger that can record transactions between two parties efficiently and in a verifiable and permanent way.

A blockchain is typically managed by multiple parties collectively adhering to a protocol for inter-node communication and validating new blocks. Once recorded, the data in any given block cannot be altered retroactively without alteration of all subsequent blocks, which requires consensus among the operators.

Cryptography involving mathematical methods of keeping data secret and proving identity is utilized when recording transactions. One digital key ensures only an owner for example on a transaction requesting device 1202, can enter a transaction to the blockchain involving their assets, and another digital key lets other parties confirm it really was the owner who added the transaction.

Blockchain is resistant to tampering or other changes by utilizing a cryptographic technique called the hash. Hashing reduces data to a sequence of seemingly random characters—for example, the hash of the phrase "the quick brown fox" is "9ECB36561341D18EB65484E833EFEA61EDC74B84C F5E6AE1B81C63533E25FC8F" using a hash method called SHA-256. Tweaking just one letter in the phrase produces a completely different hash, and you can't go backward to figure out the original data from the hash.

With blockchain, hashes are linked together so any minute change is immediately visible, not just for the block housing it but for all other blocks added later. With red flags that big for changes that small, auditing becomes easier.

Figure 13:
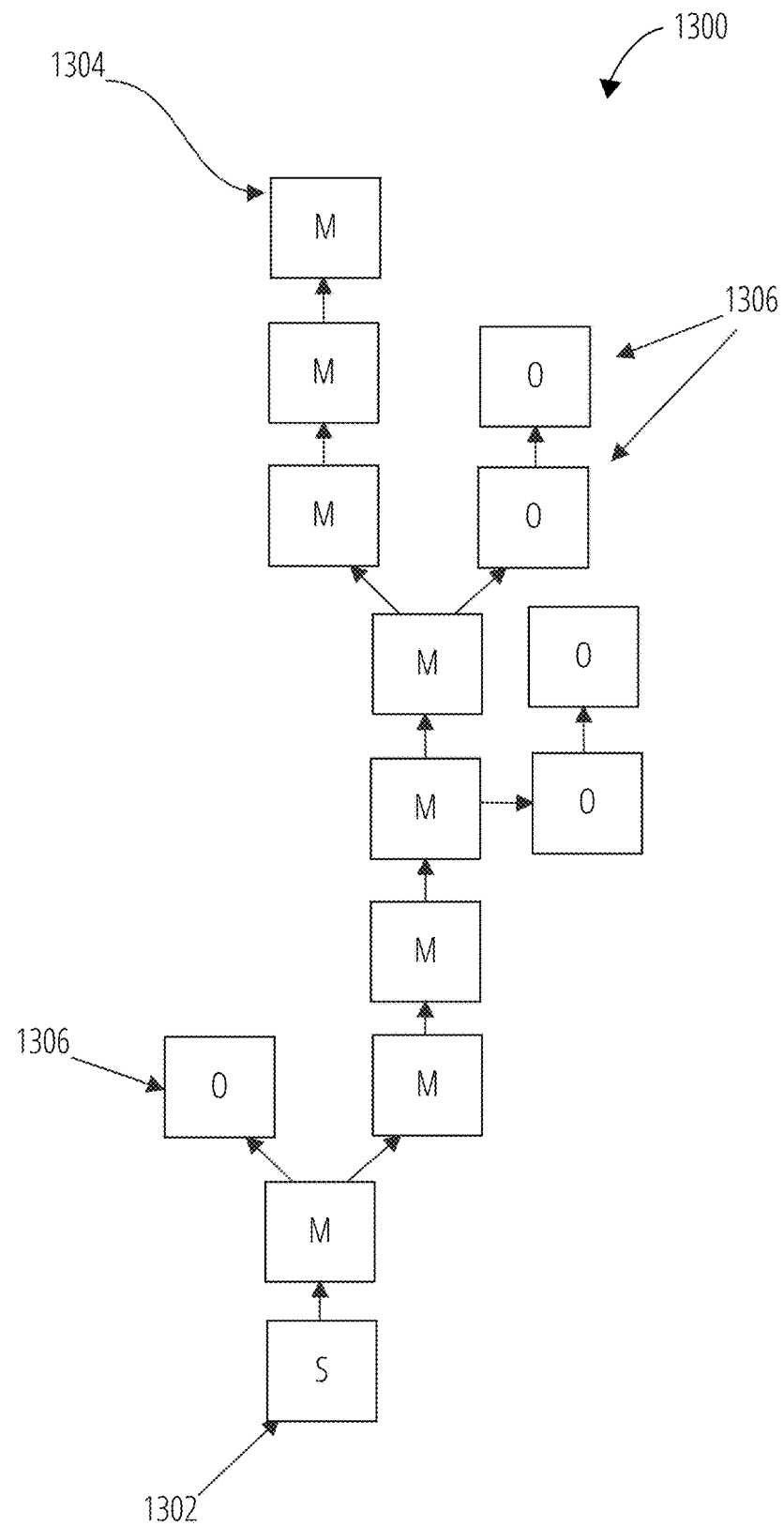
FIG. 13 illustrates a blockchain formation 1300 in accordance with one embodiment.

FIG. 13 illustrates an exemplary blockchain formation 1300. The mainchain 1304 (M blocks) comprises the longest series of blocks from the start block 1302 (S block) to the current block. Orphan blocks 1306 (O blocks) exist outside of the main chain.

Blocks hold batches of valid transactions that are hashed and encoded, for example into a Merkle tree. Each block includes the cryptographic hash of the prior block in the blockchain formation 1300, linking the two. The linked blocks form a chain. This iterative process confirms the integrity of the previous block, all the way back to the original start block 1302.

Sometimes separate blocks can be produced concurrently, creating a temporary fork. In addition to a secure hash-based history, the blockchain formation 1300 has a specified algorithm for scoring different versions of the history so that one with a higher value can be selected over others. Blocks not selected for inclusion in the mainchain 1304 are called orphan blocks 1306. Peers supporting the blockchain formation 1300 have different versions of the history from time to time. They keep only the highest-scoring version of the blockchain formation 1300 known to them. Whenever a peer receives a higher-scoring version (usually the old version with a single new block added) they extend or overwrite their local version of the blockchain formation 1300 and retransmit the improvement to their peers. There is never an absolute guarantee that any particular entry will remain in the best version of the history forever. Because blockchains are typically built to add the score of new blocks onto old blocks and because there are incentives to work only on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is always considered the valid one by the network. There are a number of methods that can be used to demonstrate a sufficient level of computation. Within a blockchain the computation is carried out redundantly rather than in the traditional segregated and parallel manner.

Figure 14:
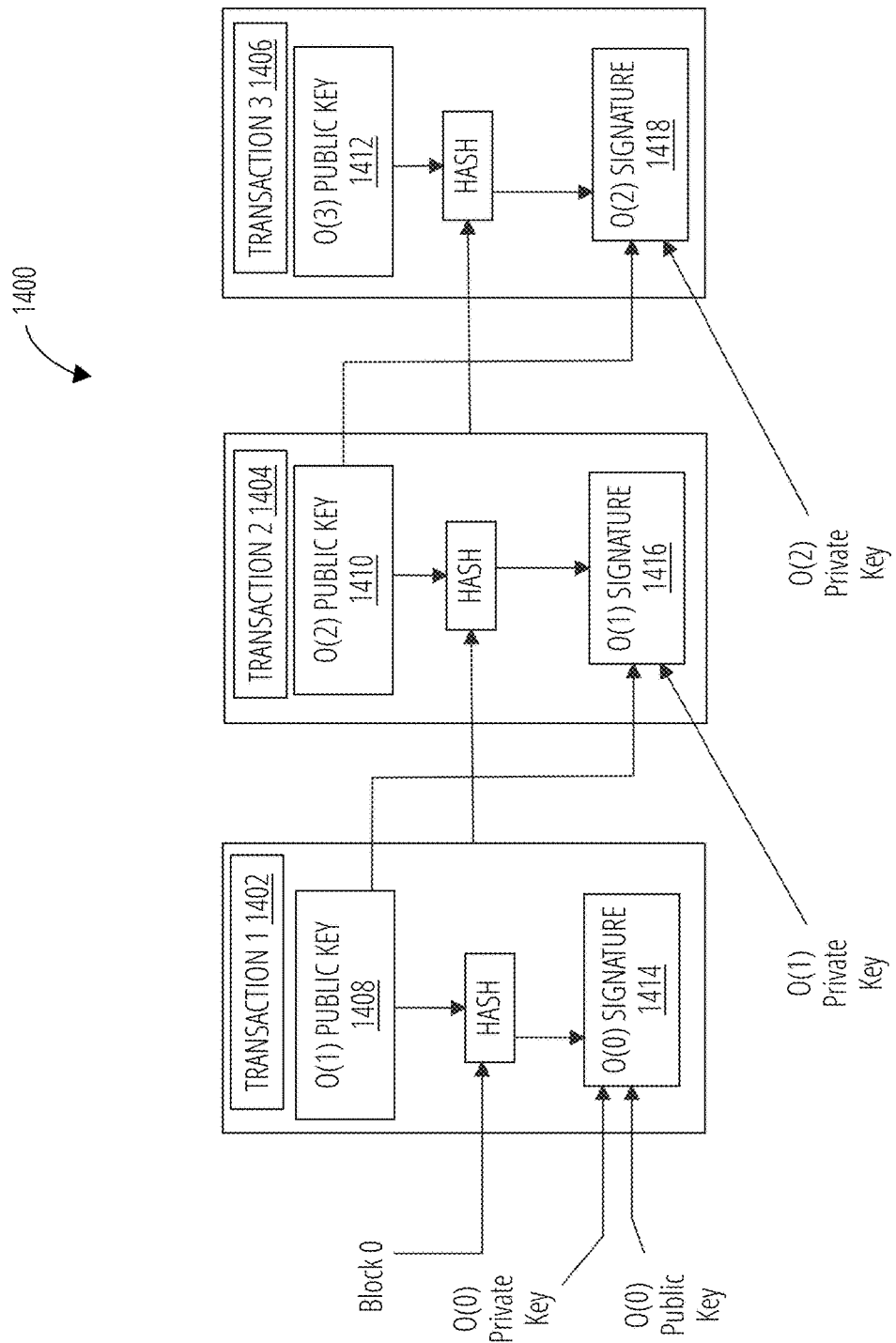
FIG. 14 illustrates a blockchain 1400 in accordance with one embodiment.

FIG. 14 illustrates an embodiment of an irreversible transaction blockchain 1400. The blockchain 1400 is a sequence of digitally signed transactions (transaction 1 1402, transaction 2 1404, and transaction 3 1406 etc.). Each transaction includes the current owners public key (block 1 owner public key 1408, block 2 owner public key 1410, and block 3 owner public key 1412 respectively) and the previous owner's signature (O(0) signature 1414, O(1) signature 1416, and O(2) signature 1418) which are generated using a hash function. The owner of a transaction can examine each previous transaction to verify the chain of ownership. Unlike traditional check endorsements, the transactions in the blockchain 1400 are irreversible, which mitigates fraud.

In some configurations, a machine learning algorithm may be implemented as a deep learning neural network. FIG. 15 illustrates a basic deep neural network 1500 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 1502), to the last layer (the output layer 1506), possibly after traversing one or more intermediate layers, called hidden layers 1504.

Figure 16:
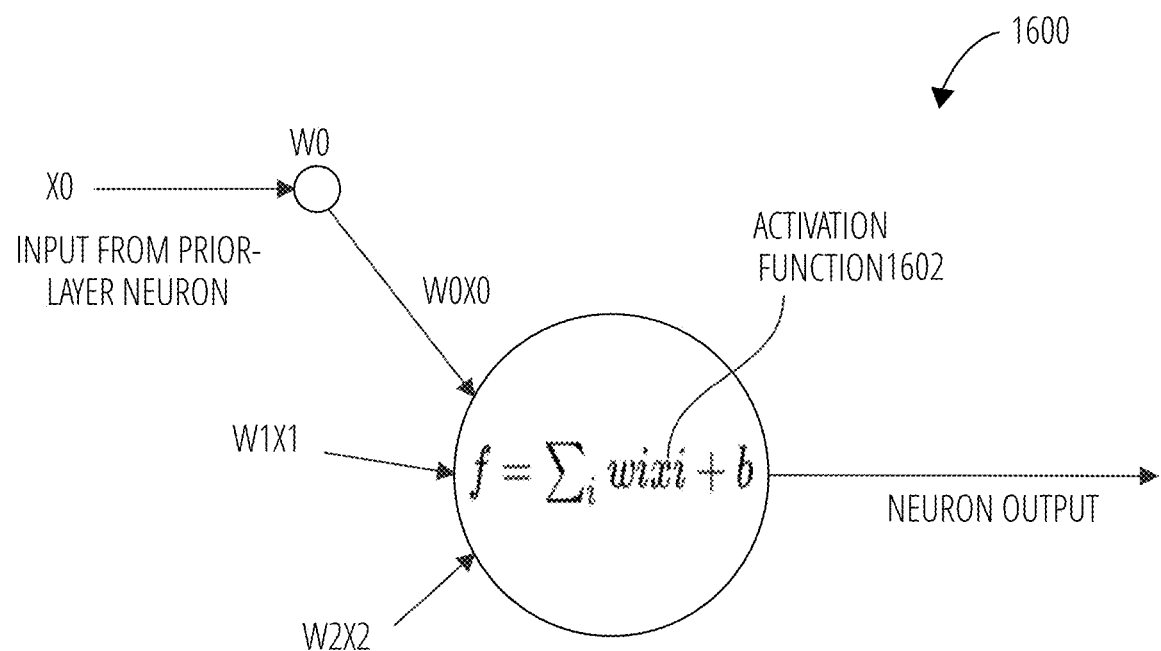
FIG. 16 illustrates an artificial neuron 1600 in accordance with one embodiment.

Referring to FIG. 16, an artificial neuron 1600 receiving inputs from predecessor neurons consists of the following components:

inputs $x_i$;

weights $w_i$ applied to the inputs;

an optional threshold (b), which stays fixed unless changed by a learning function; and an activation function 1602 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 1602 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Figure 17:
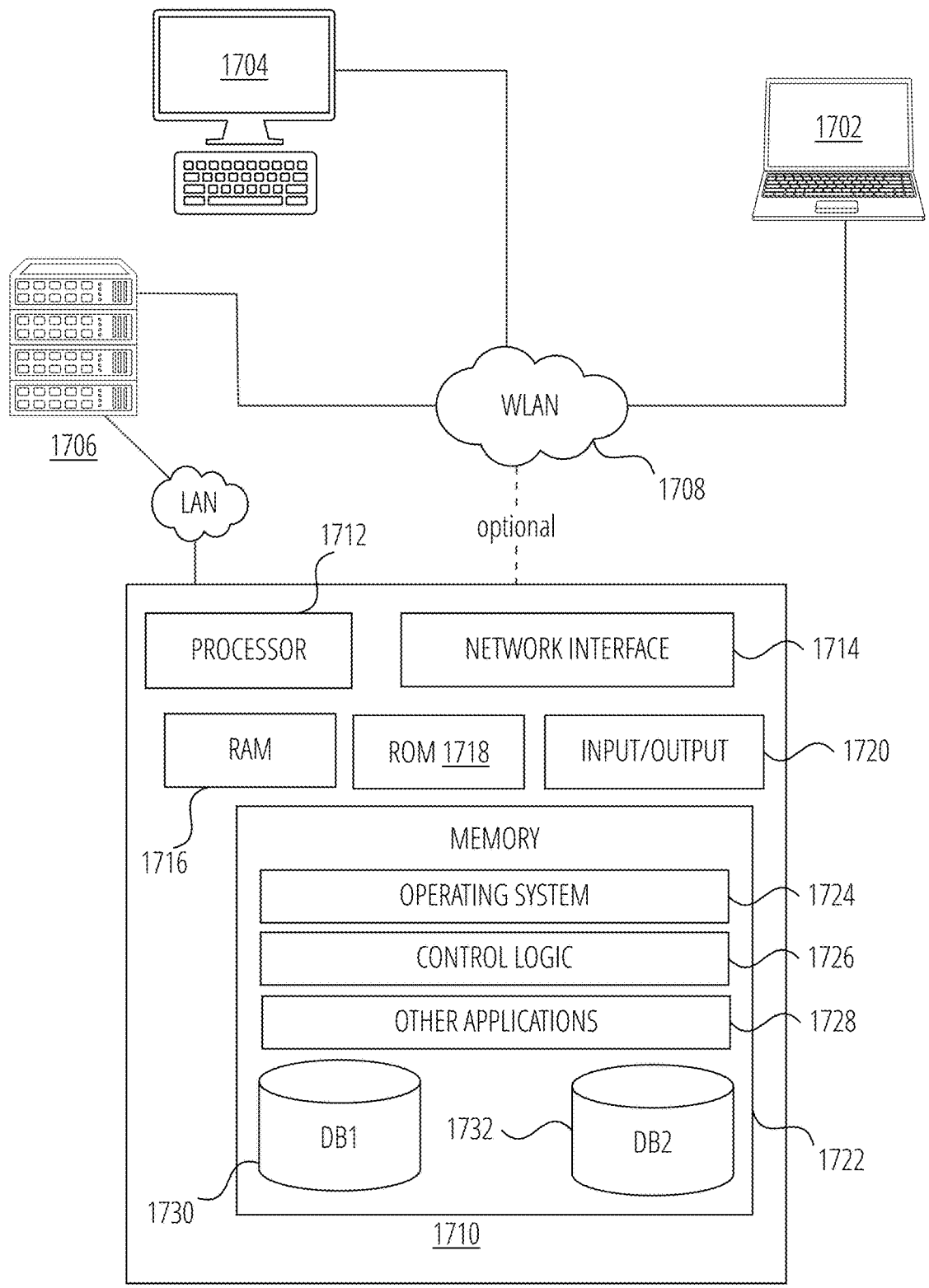
FIG. 17 depicts an illustrative computer system architecture that may be used in accordance with one or more illustrative aspects described herein.

FIG. 17 illustrates one example of a system architecture and data processing device that may be used to implement one or more illustrative aspects described herein in a stand-alone and/or networked environment. Various network nodes including data server 1710, web server 1706, computer 1704, and laptop 1702 may be interconnected via a wide area network 1708 (WAN), such as the internet. Other networks may also or alternatively be used, including private intranets, corporate networks, LANs, metropolitan area networks (MANs) wireless networks, personal networks (PANs), and the like. Network 1708 is for illustration purposes and may be replaced with fewer or additional computer networks. A local area network (LAN) may have one or more of any known LAN topology and may use one or more of a variety of different protocols, such as ethernet. Devices including data server 1710, web server 1706, computer 1704, laptop 1702 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1710, web server 1706, and client computer 1704, laptop 1702. Data server 1710 provides overall access, control and administration of databases and control software for performing one or more illustrative aspects described herein. Data server 1710 may be connected to web server 1706 through which users interact with and obtain data as requested. Alternatively, data server 1710 may act as a web server itself and be directly connected to the internet. Data server 1710 may be connected to web server 1706 through the network 1708 (e.g., the internet), via direct or indirect connection, or via some other network. Users may interact with the data server 1710 using remote computer 1704, laptop 1702, e.g., using a web browser to connect to the data server 1710 via one or more externally exposed web sites hosted by web server 1706. Client computer 1704, laptop 1702 may be used in concert with data server 1710 to access data stored therein, or may be used for other purposes. For example, from client computer 1704, a user may access web server 1706 using an internet browser, as is known in the art, or by executing a software application that communicates with web server 1706 and/or data server 1710 over a computer network (such as the internet).

Servers and applications may be combined on the same physical machines, and retain separate virtual or logical addresses, or may reside on separate physical machines. FIG. 17 illustrates just one example of a network architecture that may be used, and those of skill in the art will appreciate that the specific network architecture and data processing devices used may vary, and are secondary to the functionality that they provide, as further described herein. For example, services provided by web server 1706 and data server 1710 may be combined on a single server.

Each component including data server 1710, web server 1706, computer 1704, laptop 1702 may be any type of known computer, server, or data processing device. Data server 1710, e.g., may include a processor 1712 controlling overall operation of the data server 1710. Data server 1710 may further include RAM 1716, ROM 1718, network interface 1714, input/output interfaces 1720 (e.g., keyboard, mouse, display, printer, etc.), and memory 1722. Input/output interfaces 1720 may include a variety of interface units and drives for reading, writing, displaying, and/or printing data or files. Memory 1722 may further store operating system software 1724 for controlling overall operation of the data server 1710, control logic 1726 for instructing data server 110 to perform aspects described herein, and other application software 1728 providing secondary, support, and/or other functionality which may or may not be used in conjunction with aspects described herein. The control logic may also be referred to herein as the data server software control logic 1726. Functionality of the data server software may refer to operations or decisions made automatically based on rules coded into the control logic, made manually by a user providing input into the system, and/or a combination of automatic processing based on user input (e.g., queries, data updates, etc.).

memory 1722 may also store data used in performance of one or more aspects described herein, including a first database 1732 and a second database 1730. In some embodiments, the first database may include the second database (e.g., as a separate table, report, etc.). That is, the information can be stored in a single database, or separated into different logical, virtual, or physical databases, depending on system design. Web server 1706, computer 1704, laptop 1702 may have similar or different architecture as described with respect to data server 1710. Those of skill in the art will appreciate that the functionality of data server 1710 (or web server 1706, computer 1704, laptop 1702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A vulnerability management system for blockchain smart contracts comprising:
    a processor and a memory configured to operate:
    a sandbox engine configured to scan the smart contracts for vulnerabilities;
    a knowledge base engine including artificial intelligence, the knowledge base engine configured to acquire information related to new vulnerabilities and threat intelligence;
    a risk scoring engine including machine learning, the risk scoring engine configured to analyze sandbox engine outcomes and assign a risk score to each vulnerable smart contract; and
    a security control system configured to take an action on an identified vulnerable smart contract based on the risk score assigned to the identified vulnerable smart contract,
    the sandbox engine configured to receive, without manual intervention, smart contract code executed across a distributed, decentralized blockchain network; and
    the sandbox engine including:
        a static analysis unit configured to perform static code scanning of the smart contract code;
        a dynamic analysis unit configured to generate compiled smart contract code and execute the compiled smart contract code in a virtual machine;
        a statistical analysis unit comprising a database of global statistics for the smart contracts and configured to:
            receive the risk score of each vulnerable smart contract from the risk scoring engine;
            identify similar smart contracts from the database of global statistics; and
            generate statistical vulnerability data representing each smart contract's standing within a population of the similar smart contracts with respect to each smart contract's vulnerabilities; and
        an audit report generation unit configured to generate a heatmap based on the statistical vulnerability data of the statistical analysis unit,
        wherein the heatmap comprises a graph displaying the risk score as a function of a number of lines of smart contract code.

2. The vulnerability management system of claim 1, wherein the risk scoring engine includes:
    a regression model including a machine learning algorithm;
    access to at least one database of smart contracts, the at least one database of smart contracts including:
        known vulnerabilities of the smart contracts;
        known vulnerable smart contracts; and
        known legitimate smart contracts;
    an offline training engine configured to estimate parameters of the machine learning algorithm and provided training data; and
    an online prediction engine comprising the risk scoring engine.

3. The vulnerability management system of claim 2, wherein the provided training data includes feature vectors from the known legitimate smart contracts and feature vectors from the known vulnerable smart contracts.

4. The vulnerability management system of claim 1, wherein the security control system includes:
    logic to identify the smart contracts;
    logic to scan the smart contracts for the vulnerabilities and identify those smart contracts as vulnerable smart contracts;
    logic to protect the smart contracts including the ability to suspend trading of the vulnerable smart contracts on a smart contract trading exchange; and
    logic to respond to a trade on the smart contract trading exchange, the trade including the vulnerable smart contracts and legitimate smart contracts, wherein the vulnerable smart contracts are suspended and the legitimate smart contracts are allowed to proceed.

5. The vulnerability management system of claim 1, wherein the knowledge base engine updates the information upon receiving the threat intelligence to include a reentrancy vulnerability pattern.

6. The vulnerability management system of claim 5, wherein the reentrancy vulnerability pattern is detected by a dynamic analysis unit of the sandbox engine.

7. The vulnerability management system of claim 5, wherein the reentrancy vulnerability pattern is described as key-value pairs.

8. A method of protecting smart contracts, the method comprising:
using a processor and a memory configured for:
scanning the smart contracts for vulnerabilities using a sandbox engine;
acquiring information related to new vulnerabilities and threat intelligence using a knowledge base engine including artificial intelligence;
analyzing sandbox engine outcomes and assigning a risk score to each vulnerable smart contract using a risk scoring engine including machine learning; and
taking an action on an identified vulnerable smart contract based on the risk score assigned to the identified vulnerable smart contract using a security control system,
receiving, without manual intervention, smart contract code executed across a distributed, decentralized blockchain network; and
the sandbox engine including:
a static analysis unit configured to perform static code scanning of the smart contract code;
a dynamic analysis unit configured to generate compiled smart contract code and execute the compiled smart contract code in a virtual machine;
a statistical analysis unit comprising a database of global statistics for the smart contracts and configured to:
receive the risk score of each vulnerable smart contracts from the risk scoring engine;
identify similar smart contracts from the database of global statistics; and
generate statistical vulnerability data representing each smart contract's standing within a population of similar smart contracts with respect to each smart contract's vulnerabilities; and
an audit report generation unit configured to generate a heatmap based on the statistical vulnerability data of the statistical analysis unit,
wherein the heatmap comprises a graph displaying the risk score as a function of a number of lines of smart contract code.

9. The method of claim 8, where in the risk scoring engine includes:
a regression model including a machine learning algorithm;
access to at least one database of smart contracts, the at least one database of smart contracts including:
known vulnerabilities of the smart contracts;
known vulnerable smart contracts; and
known legitimate smart contracts;
an offline training engine configured to estimate parameters of the machine learning algorithm and provided training data; and
an online prediction engine comprising the risk scoring engine.

10. The method of claim 9, wherein the provided training data includes feature vectors from the known legitimate smart contracts and feature vectors from the known vulnerable smart contracts.

11. The method of claim 8, wherein the security control system includes:
logic to identify smart contracts;
logic to scan smart contracts for the vulnerabilities and identify those smart contracts as vulnerable smart contracts;
logic to protect smart contracts including the ability to suspend trading of the vulnerable smart contracts on a smart contract trading exchange; and
logic to respond to a trade on the smart contracts trading exchange, the trade including the vulnerable smart contracts and legitimate smart contracts, wherein the vulnerable smart contracts are suspended and the legitimate smart contracts are allowed to proceed.

12. A non-transitory computer-readable storage medium, the computer-readable storage medium including instructions that when executed by a computer including a processor and a memory, cause the computer to:
scan smart contracts for vulnerabilities using a sandbox engine;
acquire information related to new vulnerabilities and threat intelligence using a knowledge base engine including artificial intelligence;
analyze sandbox engine outcomes and assign a risk score to each vulnerable smart contract using a risk scoring engine including machine learning; and
take an action on an identified vulnerable smart contract based on the risk score assigned to the identified vulnerable smart contract using a security control system,
the sandbox engine configured to receive, without manual intervention, smart contract code executed across a distributed, decentralized blockchain network; and
the sandbox engine including:
a static analysis unit configured to perform static code scanning of the smart contract code;
a dynamic analysis unit configured to generate compiled smart contract code and execute the compiled smart contract code in a virtual machine;
a statistical analysis unit comprising a database of global statistics for the smart contracts and configured to:
receive the risk score of each vulnerable smart contract from the risk scoring engine;
identify similar smart contracts from the database of global statistics; and
generate statistical vulnerability data representing each smart contract's standing within a population of similar smart contracts with respect to each smart contract's vulnerabilities; and
an audit report generation unit configured to generate a heatmap based on the statistical vulnerability data of the statistical analysis unit,
wherein the heatmap comprises a graph displaying the risk score as a function of a number of lines of smart contract code.

13. The non-transitory computer-readable storage medium of claim 12, wherein the security control system includes:
logic to identify smart contracts;
logic to scan the smart contracts for the vulnerabilities and identify those smart contracts as vulnerable smart contracts;
logic to protect smart contracts including the ability to suspend trading of the vulnerable smart contracts on a smart contract trading exchange; and
logic to respond to a trade on the smart contract trading exchange, the trade including the vulnerable smart contracts and legitimate smart contracts, wherein the vulnerable smart contracts are suspended and the legitimate smart contracts are allowed to proceed.

14. The non-transitory computer-readable storage medium of claim 12, wherein the knowledge base engine updates the information upon receiving the threat intelligence to include a reentrancy vulnerability pattern.

15. The non-transitory computer-readable storage medium of claim 14, wherein the reentrancy vulnerability pattern is detected by a dynamic analysis unit of the sandbox engine.

* * * * *